US006725543B2

(12) United States Patent
Sarojiniamma et al.

(10) Patent No.: US 6,725,543 B2
(45) Date of Patent: Apr. 27, 2004

(54) DROPLET DEPOSITION APPARATUS

(75) Inventors: Veena K. Sarojiniamma, Cambridge (GB); Salhadin Omer, Cambridge (GB); Angus Condie, Cambridge (GB); Jerzy M. Zaba, Cambridge (GB)

(73) Assignee: Xaar Technology Limited, Cambridge (GB)

( * ) Notice: Subject to any disclaimer, the term of this patent is extended or adjusted under 35 U.S.C. 154(b) by 0 days.

(21) Appl. No.: 10/062,322

(22) Filed: Jan. 31, 2002

(65) Prior Publication Data

US 2002/0135643 A1 Sep. 26, 2002

Related U.S. Application Data

(63) Continuation of application No. PCT/GB00/03153, filed on Aug. 14, 2000.

(30) Foreign Application Priority Data

Aug. 14, 1999 (GB) ............................................ 9919201
May 13, 2000 (GB) ............................................ 0011483

(51) Int. Cl.$^{7}$ ......................... B21D 53/76; H04R 17/00; B23P 17/00

(52) U.S. Cl. ........................ 29/890.1; 29/25.35; 29/416

(58) Field of Search ................................ 29/25.35, 830, 29/890.1, DIG. 1, 412, 413, 416, 417, 418; 83/51, 875, 880; 156/252, 253, 257, 281, 325

(56) References Cited

U.S. PATENT DOCUMENTS

| | | | | |
|---|---|---|---|---|
| 5,193,256 A | | 3/1993 | Ochiai et al. | 29/25.35 |
| 5,248,998 A | | 9/1993 | Ochiai et al. | 346/140 R |
| 5,351,375 A | | 10/1994 | Ochiai et al. | 29/25.35 |
| 5,369,060 A | * | 11/1994 | Baumann et al. | 438/460 |
| 5,432,540 A | | 7/1995 | Hiraishi | 347/69 |
| 5,767,878 A | | 6/1998 | Murphy | 347/71 |
| 5,779,837 A | * | 7/1998 | Harvey | 156/153 |
| 5,787,558 A | | 8/1998 | Murphy | 29/25.35 |
| 5,801,731 A | | 9/1998 | Takahashi | 347/69 |
| 5,889,539 A | | 3/1999 | Kamoi et al. | 347/50 |
| 5,901,425 A | | 5/1999 | Bibl et al. | 29/25.35 |

FOREIGN PATENT DOCUMENTS

| | | |
|---|---|---|
| EP | 0 277 703 A1 | 8/1988 |
| EP | 0 326 973 A2 | 8/1989 |
| EP | 0 364 136 A2 | 4/1990 |
| EP | 0 376 606 A1 | 7/1990 |
| EP | 0 397 441 A2 | 11/1990 |
| EP | 0 505 065 A2 | 9/1992 |
| EP | 0 522 814 A2 | 1/1993 |
| EP | 0 566 244 A2 | 10/1993 |
| EP | 0 676 286 A2 | 10/1995 |
| EP | 0 704 305 A2 | 4/1996 |

(List continued on next page.)

OTHER PUBLICATIONS

International Search Report in PCT/GB00/03153 dated Feb. 7, 2001.

International Preliminary Examination Report in PCT/GB00/03153, dated Nov. 8, 2001.

*Primary Examiner*—Carl J. Arbes
*Assistant Examiner*—Thiem Dinh Phan
(74) *Attorney, Agent, or Firm*—Marshall, Gerstein & Borun LLP

(57) ABSTRACT

A component for a drop-on-demand piezoelectric printhead is formed from a block of piezoelectric material and a substrate. The block of piezoelectric material has grooves formed in its lower surface and is attached to the substrate using an adhesive that is applied in sufficient quantity such that adhesive enters the grooves cut into the piezoelectric material. Upper grooves are sawn into the piezoelectric material through to the glue-filled lower channels in order to form ejection channels, the walls of which are separated from one another by means of a glue fillet.

15 Claims, 21 Drawing Sheets

FOREIGN PATENT DOCUMENTS

| | | | |
|---|---|---|---|
| EP | 0 755 792 | A2 | 1/1997 |
| EP | 0 839 656 | A1 | 5/1998 |
| JP | 3-292146 | | 12/1991 |
| JP | 5-64893 | | 3/1993 |
| JP | 9-10983 | | 1/1997 |
| WO | WO 91/17051 | | 11/1991 |
| WO | WO 92/09436 | | 6/1992 |
| WO | WO 92/22429 | | 12/1992 |
| WO | WO 93/15911 | | 8/1993 |
| WO | WO 95/04658 | | 2/1995 |
| WO | WO 95/07820 | | 3/1995 |
| WO | WO 98/17477 | | 4/1998 |
| WO | WO 98/52763 | | 11/1998 |

* cited by examiner

DROPLET DEPOSITION APPARATUS

CROSS-REFERENCE TO RELATED APPLICATIONS

This is a continuation of International Application No. PCT/GB00/03153 filed Aug. 14, 2000, the entire disclosure of which is incorporated herein reference.

BACKGROUND OF THE INVENTION

1. Field of the Invention

The present invention relates to droplet deposition apparatus, particularly ink jet print heads, components therefore and methods for manufacturing such components.

2. Description of Related Art

A particularly useful form of inkjet printer comprises a body of piezoelectric material with ink channels formed, for example, by disc cutting. Electrodes can be plated on the channel facing surfaces of the piezoelectric material, enabling an electrical field to be applied to the piezoelectric "wall" defined between adjacent channels. With appropriate poling, this wall can be caused to move into or out of the selected ink channel, causing a pressure pulse which ejects an ink droplet through an appropriate channel nozzle. Such a construction is shown, for example, in EP-A-0 364 136.

It is a frequent requirement to provide a high density of such ink channels, with precise registration across a relatively large expanse of printhead, perhaps an entire page width. A construction that is useful to this end is disclosed in WO 98/52763. It involves the use of a flat base plate that supports the piezoelectric material as well as integrated circuits performing the necessary processing and control functions.

Such a construction has several advantages, particularly with regard to manufacture. The base plate acts as a "backbone" for the printhead, supporting the piezoelectric material and integrated circuits during manufacture. This support function is particularly important during the process of buffing together multiple sheets of piezoelectric material to form a contiguous, pagewide array of ink channels. The relatively large size of the base plate also simplifies handling.

The plating produced for use in inkjet printing and in particular plating produced using electroless plating methods are not bonded to the printhead by chemical means and rely upon the surface topography to provide attachment points. The adhesives used typically in an inkjet printer do not provide a good surface for holding an electrode as the surface of the glues tend to be smooth. This leads to a poor bond between the adhesive and metal of the electrode and can result in lift off or breakage of the metal either during use or during further manufacturing stages. These problems cause reduced operation and can cause other defects such as electrical shorts. The present invention seeks to overcome this problem by using an adhesive that contains particles which provide keying points for improved bond strength.

Problems remain of reliably and efficiently establishing a uniform bond between the body of piezoelectric material and the substrate. In particular, a poorly formed glue layer gives rise to variations in the activity of the channel walls which in turn results in droplet deviations and consequently to a reduced quality of image. Crosstalk both electrical and mechanical between neighboring channels through the base of the piezoelectric material is also a problem that the present invention seeks to overcome.

Further problems result from the high level of flatness required from the substrate. A poorly finished substrate can give rise to a variation in the activity of channels across the width of the head, and can damage the saw when trying to cut channels of uniform depth since the material of the substrate can often be significantly harder that of the piezoelectric material.

SUMMARY OF THE INVENTION

The present invention seeks to provide improved apparatus and methods which address these problems.

According to one aspect of the present invention, there is provided a component suitable for use in a droplet deposition apparatus comprising a body of piezoelectric material having a top surface, and a bottom surface which is attached to a base, the body having a plurality of upper channels extending from the top surface into the piezoelectric body and a corresponding plurality of lower channels extending from the bottom surface of the body into the piezoelectric body; characterised in that the channels are of such a depth that there is a connection between at least one of the upper channel to a corresponding lower channel.

A second aspect of the present invention is found in a component suitable for use in a droplet deposition apparatus, the component being formed from a body of piezoelectric material and a base; the method comprising the steps of attaching the body to the base using an adhesive which contains particles having a stiffness greater than the stiffness of the adhesive, and sawing channels into the body.

A third aspect of the present invention consists in a method of forming a component for use in a droplet deposition apparatus comprising the steps of providing a base and a body of piezoelectric material having a top surface and a bottom surface, sawing lower channels into the bottom surface of the body, adhesively bonding said bottom surface of the body to the base by an adhesive layer, and subsequently sawing upper channels into the top surface of the body extending into the body; characterised in that the upper channels extend through the body and into the adhesive layer.

As known in the prior art the piezoelectric body can be made of a single block of piezoelectric material polarised in a single direction or a laminate of two blocks polarised in opposite directions. It has been noted by the applicant that problems can occur when applying actuating electrodes to the sawn channels of glued piezoelectric laminates in that a connection occasionally may not be formed across the bond. The present invention seeks to overcome this problem.

In a fourth aspect of the present invention a body of piezoelectric material formed from a laminate of two or more sheets having different polarisation directions is formed according to the following method: two or more sheets of piezoelectric material are provided and an adhesive is applied to one or more of said sheets of piezoelectric material which are subsequently joined to form the laminate; characterised in that the adhesive contains particles which have a stiffness greater than that of the adhesive.

In one embodiment of this aspect of the present invention, the piezoelectric sheets are polarised in opposite directions. In a further embodiment, the polarisation is perpendicular to the thickness of one or more of the sheet. In yet a further embodiment one or more of the sheets are polarised whilst the other sheets are unpoled, depoled or formed of a non piezoelectric material.

A fifth aspect of the present invention is a method of forming a component for use in a droplet deposition apparatus comprising the steps of providing a base (86), and a body (100) of piezoelectric material having a top surface and a bottom surface; sawing a plurality of lower channels (630) into the bottom surface of the body; bonding said bottom surface of the body to the base by adhesive means (710); and subsequently sawing a plurality of upper channels (7) into the top surface of the body; characterised in that at least one of the upper channels is sawn to such a depth that it extends through the body and connects to a corresponding lower channel.

Aspects of the present invention are also found in components formed using the above methods. A component suitable for use in a droplet deposition apparatus comprises a body of piezoelectric material having a top surface, and a bottom surface which is attached to a base, the body having a plurality of upper channels extending from the top surface into the piezoelectric body and a corresponding plurality of lower channels extending from the bottom surface of the body into the piezoelectric body; characterised in that the channels are of such a depth that at least one of the upper channels extends through the body to a corresponding lower channel so that a connection is formed between them.

BRIEF DESCRIPTION OF THE DRAWINGS

The invention will now be described by way of example with reference to the accompanying drawings, in which.

DETAILED DESCRIPTION OF THE INVENTION

It will be helpful to describe first in some detail, examples of the prior art constructions referred to briefly above.

Figure 1:
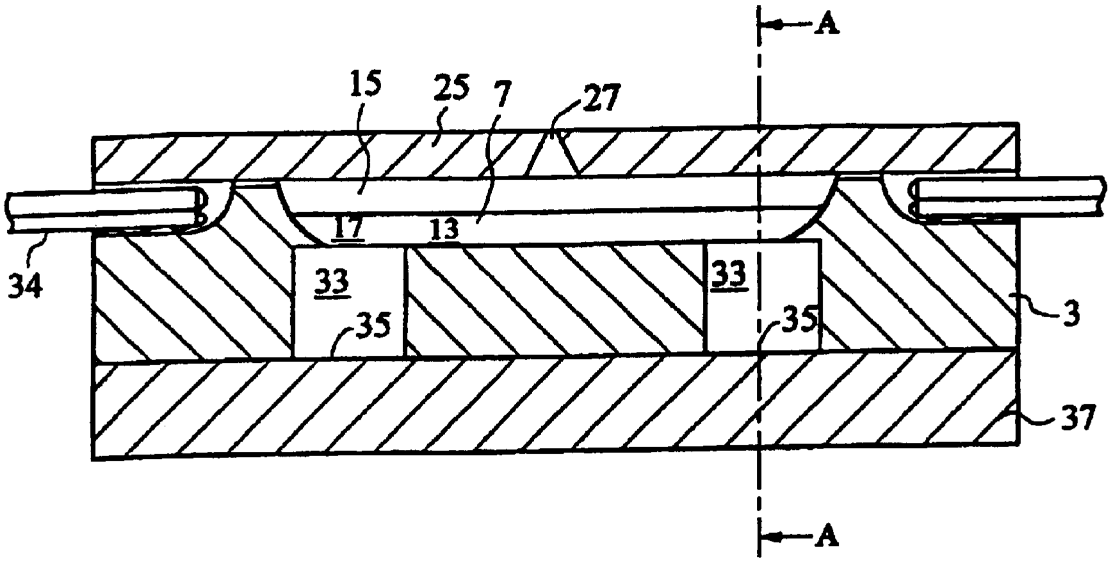
Fig. 1 Prior Art
FIG. 1 is a longitudinal sectional view through a known ink jet printhead.

Thus, FIG. 1 shows a prior art inkjet printhead 1 of the kind disclosed in WO 91/17051 and comprising a sheet 3 of piezoelectric material, for example lead zirconium titanate (PZT), formed in a top surface thereof with an array of open-topped ink channels 7. As evident from FIG. 2, which is a sectional view taken along line AA of FIG. 1, successive channels in the array are separated by side walls 13 which comprise piezoelectric material poled in the thickness direction of the sheet 3 (as indicated by arrow P).

On opposite channel-facing surfaces 17 are arranged electrodes 15 to which voltages can be applied via connections 34. As is known, e.g. from EP-A-0 364 136, application of an electric field between the electrodes on either side of a wall results in shear mode deflection of the wall into one of the flanking channels—this is shown exaggerated by dashed lines in FIG. 2 which in turn generates a pressure pulse in that channel.

Figure 2:
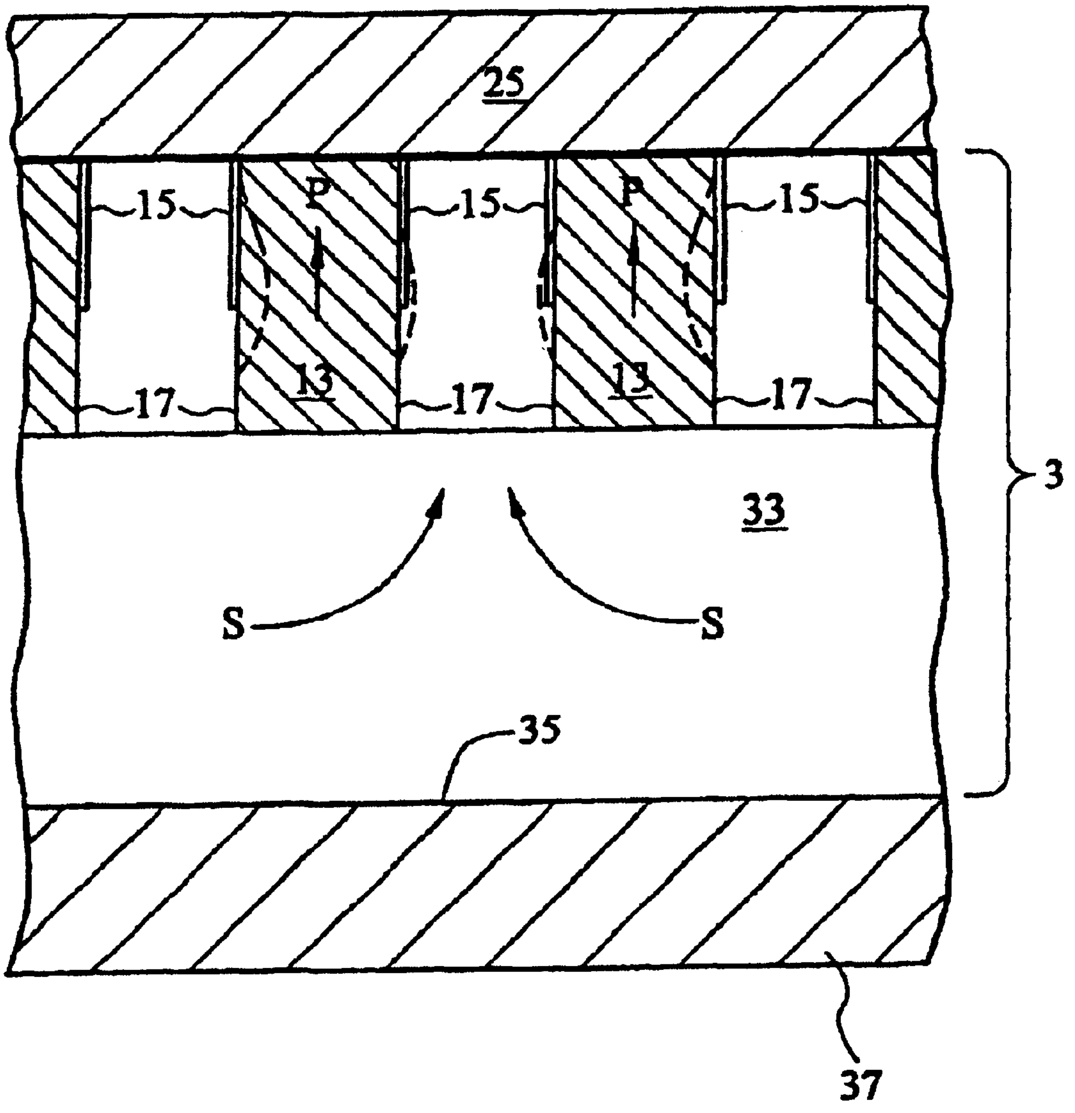
Fig. 2 Prior Art
FIG. 2 is a transverse sectional view on line AA of FIG. 1.

The channels are closed by a cover 25 in which are formed nozzles 27 each communicating with respective channels at the mid-points thereof. Droplet ejection from the nozzles takes place in response to the aforementioned pressure pulse, as is well known in the art. Supply of droplet fluid into the channels, indicated by arrows S in FIG. 2, is via two ducts 33 cut into the bottom face 35 of sheet 3 to a depth such that they communicate with opposite ends respectively of the channels 7. Such a channel construction may consequently be described a double-ended side-shooter arrangement. A cover plate 37 is bonded to the bottom face 35 to close the ducts.

Figure 3:
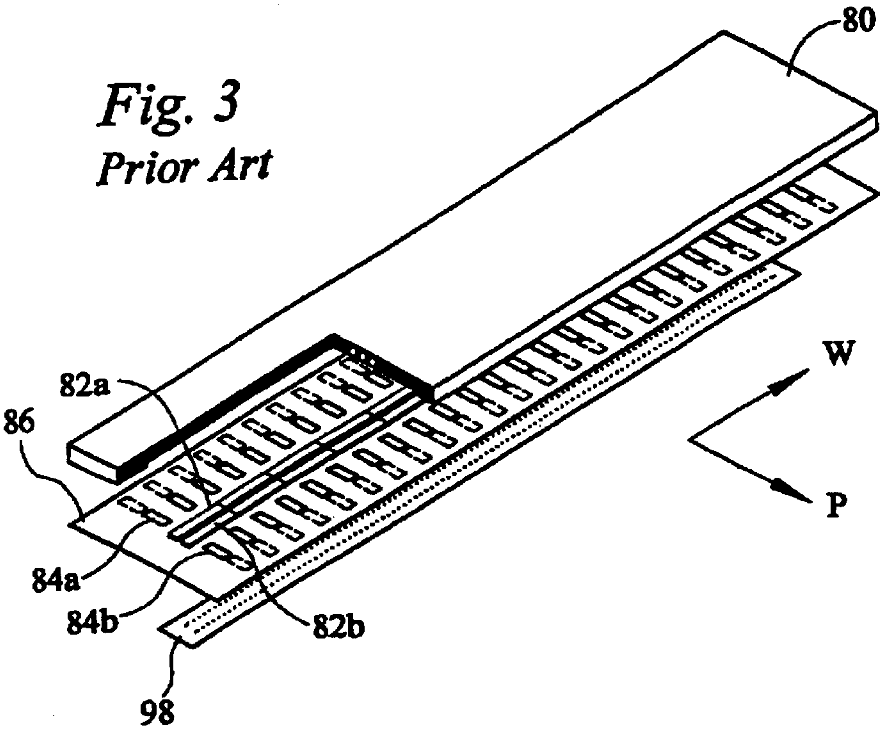
Fig. 3 Prior Art
FIG. 3 is an exploded view of a page wide printhead array according to the prior art.
Figure 4:
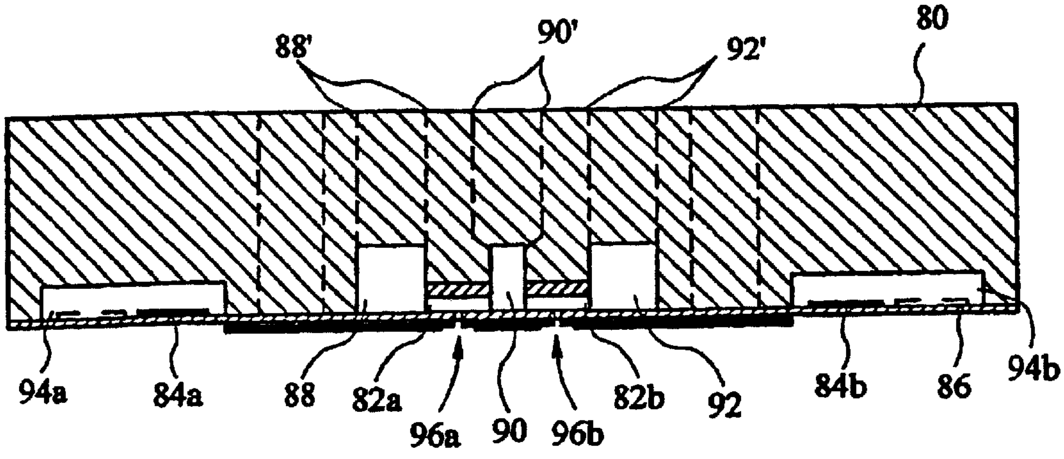
Fig. 4 Prior Art
FIG. 4 is an assembled longitudinal sectional view through the printhead shown in FIG. 3.

FIGS. 3 and 4 are exploded perspective and sectional views respectively of a printhead employing the double-ended side-shooter concept of FIGS. 1 and 2 in a "page-wide" configuration. Such a printhead is described in WO 98/52763, incorporated herein by reference. Two rows of channels spaced relatively to one another in the media feed direction are used, with each row extending the width of a page in a direction W transverse to a media feed direction P. Features common with the embodiment of FIGS. 1 and 2 are indicated by the same reference numerals used in FIGS. 1 and 2.

As shown in FIG. 4, which is a sectional view taken perpendicular to the direction W, two piezoelectric sheets 82*a*, 82*b* each having channels (formed in their bottom surface rather than their top as in the previous example) and electrodes as described above are closed (again on their bottom surface rather than their top) by a flat, extended base 86 in which openings 96*a*, 96*b* for droplet ejection are formed. Base 86 is also formed with conductive tracks (not shown) which are electrically connected to respective channel electrodes, e.g. by solder bonds as described in WO 92/22429, and which extend to the edge of the base where respective drive circuitry (integrated circuits 84*a*, 84*b*) for each row of channels is located.

Such a construction has several advantages, particularly with regard to manufacture. Firstly, the extended base 86 acts as a "backbone" for the printhead, supporting the piezoelectric sheets 82*a*, 82*b* and integrated circuits 84*a*, 84*b* during manufacture. This support function is particularly important during the process of butting together multiple sheets to form a single, contiguous, pagewide array of channels, as indicated at 82*a* and 82*b* in the perspective view of FIG. 3. The size of the extended cover also simplifies handling.

Another advantage arises from the fact that the surface of the base on which the conductive tracks are required to be formed is flat, i.e. it is free of any substantial discontinues.

As such, it allows many of the manufacturing steps to be carried out using proven techniques used elsewhere in the electronics industry, e.g. photolithographic patterning for the conductive tracks and "flip chip" for the integrated circuits. Photolithographic patterning in particular is unsuitable where a surface undergoes rapid changes in angle due to problems associated with the spinning method typically used to apply photolithographic films. Flat substrates also have advantages from the point of view of ease of processing, measuring, accuracy and availability.

A prime consideration when choosing the material for the base is, therefore, whether it can easily be manufactured into a form where it has a surface free of substantial discontinuities. A second requirement is for the material to have thermal expansion characteristics similar to the piezoelectric material used elsewhere in the print head. A final requirement is that the material be sufficiently robust to withstand the various manufacturing processes. Aluminium nitride, alumina, INVAR or special glass AF45 are all suitable candidate materials.

The droplet ejection openings 96*a*, 96*b* may themselves be formed with a taper, as per the embodiment of FIG. 1, or the tapered shape may be formed in a nozzle plate 98 mounted over the opening. Such a nozzle plate may comprise any of the readily-ablatable materials such as polyimide, polycarbonate and polyester that are conventionally used for this purpose. Furthermore, nozzle manufacture can take place independently of the state of completeness of the rest of the printhead: the nozzle may be formed by ablation from the rear prior to assembly of the active body 82*a* onto the base or substrate 86 or from the front once the active body is in place. Both techniques are known in the art. The former method has the advantage that the nozzle plate can be replaced or the entire assembly rejected at an early stage in assembly, minimising the value of rejected components. The latter method facilitates the registration of the nozzles with the channels of the body when assembled on the substrate.

Following the mounting of piezoelectric sheets 82*a*, 82*b* and drive chips 84*a*, 84*b* onto the substrate 86 and suitable testing as described, for example, in EP-A-0 376 606—a body 80 can be attached. This too has several functions, the most important of which is to define, in cooperation with the base or substrate 86, manifold chambers 90, 88 and 92 between and to either side of the two channel rows 82*a*, 82*b* respectively. Body 80 is further formed with respective conduits as indicated at 90', 88'and 92' through which ink is supplied from the outside of the printhead to each chamber. It will be evident that this results in a particularly compact construction in which ink can be circulated from common manifold 90, through the channels in each of the bodies (for example to remove trapped dirt or air bubbles) and out through chambers 88 and 92. Body 80 also provides surfaces for attachment of means for locating the completed printhead in a printer and defines further chambers 94*a*, 94*b*, sealed from ink-containing chambers 88, 90, 92 and in which integrated circuits 84*a*, 84*b* can be located.

Figure 5:
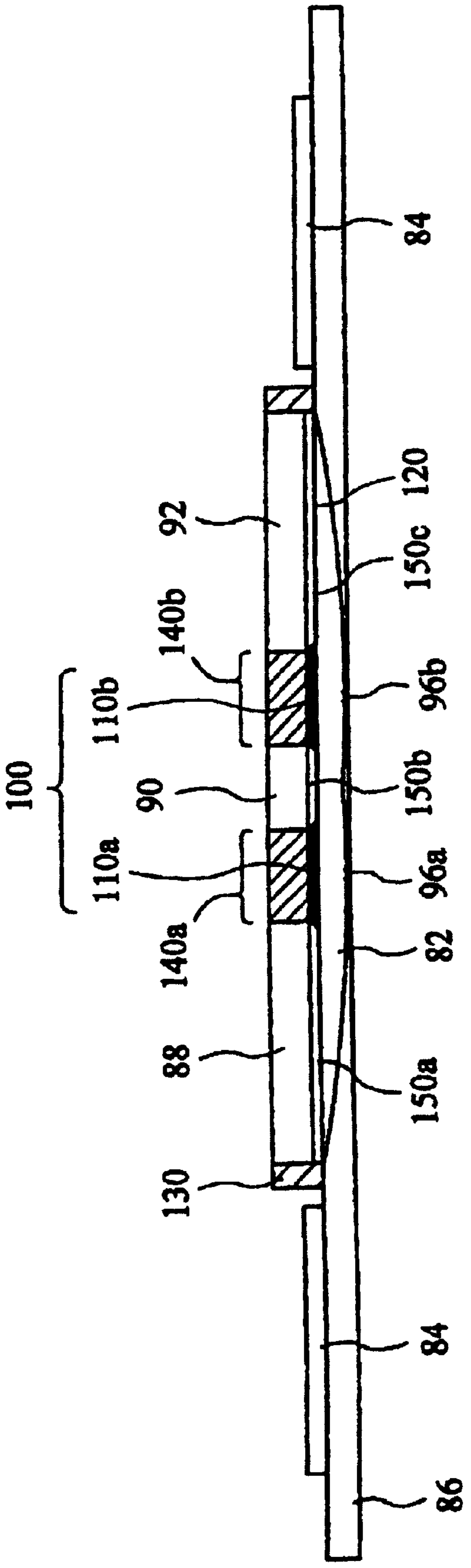
FIG. 5 is an assembled sectional view, similar to that of FIG. 4.

The printhead of FIG. 5 comprises a "pagewide" base plate or substrate 86 on which two rows of integrated circuits 84 are mounted. In-between lies a row of channels 82 formed in the substrate 86, each droplet channel of which communicates with two spaced nozzles 96*a*, 96*b* for droplet ejection and with manifolds 88, 92 and 90 arranged to either side and between nozzles 96*a*, 96*b* respectively for ink supply and circulation.

Figure 6:
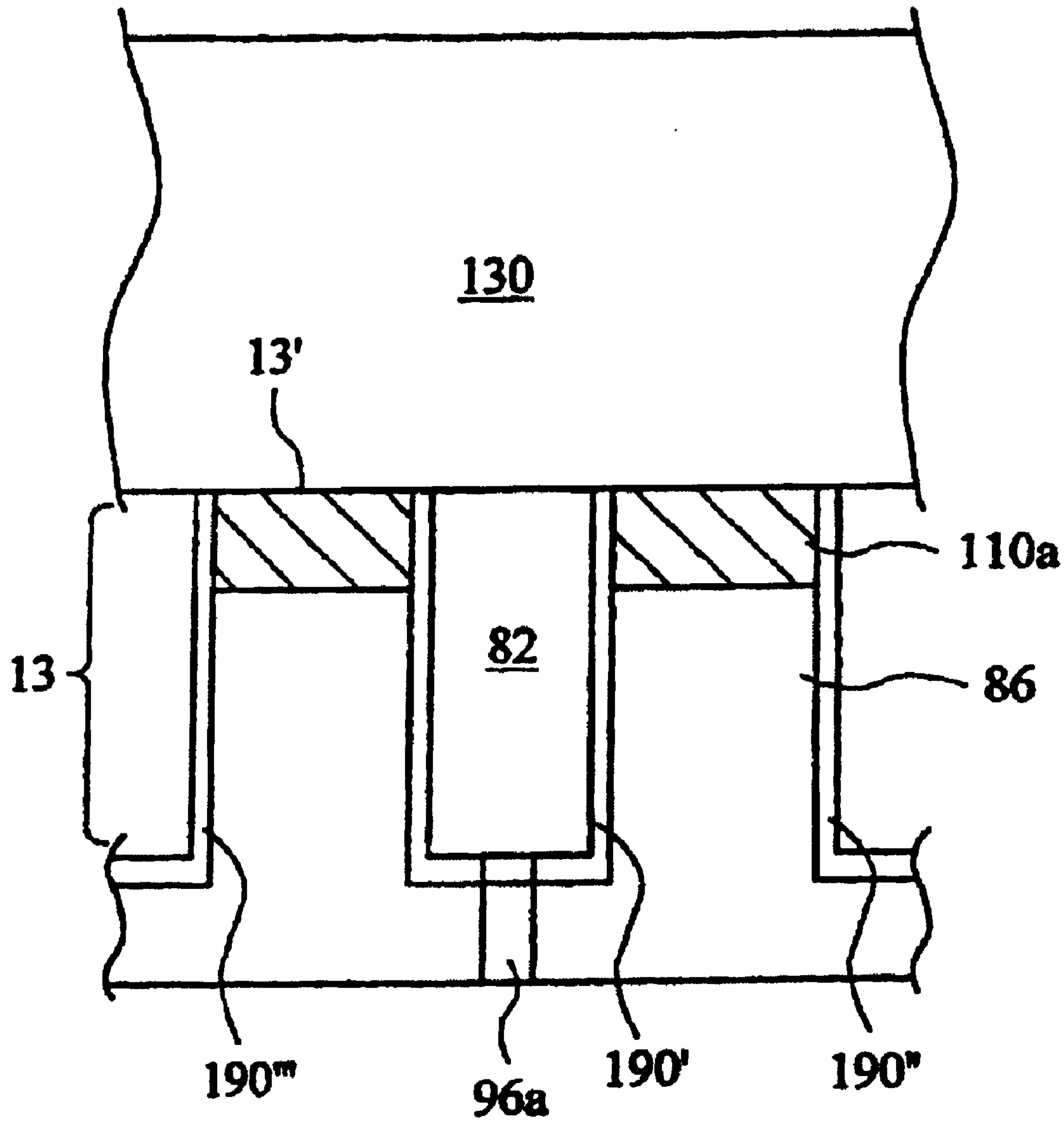
FIGS. 6 and 7 are detail sectional views taken perpendicular and parallel to the channel axis of the device of FIG. 5.

The piezoelectric material for the channel walls is incorporated in a layer 100 made up of two strips 110*a*, 110*b*. As in the embodiment of FIG. 4, these strips will be butted together in the page width direction W, each strip extending approximately 5–10 cm (this being the typical dimension of the wafer in which form such material is generally supplied). Prior to channel formation, each strip is bonded to the continuous planar surface 120 of the substrate 86, following which channels are sawn or otherwise formed so as to extend through both strip and substrate. A cross-section through a channel, its associated actuator walls and nozzle is shown in FIG. 6. Such an actuator wall construction is known, e.g. from EP-A-0 505 065 and consequently will not be discussed in any greater detail. Similarly, appropriate techniques for removing both the glue bonds between adjacent butted strips of piezoelectric material and the glue relief channels used in the bond between each piezoelectric strip and the substrate are known from U.S. Pat. No. 5,193,256 and WO 95/04658 respectively.

A continuous layer of conductive material is then applied over the channel walls and substrate. Not only does this form electrodes 190 for application of electric fields to the piezoelectric walls 13—as illustrated in FIG. 6(*a*)—and conductive tracks 192 on substrate 86 for supply of voltages to those electrodes as shown in FIG. 6(*b*)—it also forms an electrical connection between these two elements as shown at 194.

Appropriate electrode materials and deposition methods are well-known in the art. Copper, nickel and gold, used alone or in combination and deposited advantageously by electroless processes utilising palladium catalyst will provide the necessary integrity, adhesion to the piezoelectric material, resistance to corrosion and basis for subsequent passivation e.g. using silicon nitride as known in the art. Other deposition methods for example sputtering, electron beam plating and the like are also known in the art and are equally suitable.

As is generally known, e.g. from the aforementioned EP-A-0 364 136, the electrodes on opposite sides of each actuator wall 13 must be electrically isolated from one another in order that an electric field may be established between them and hence across the piezoelectric material of the actuator wall. This is shown in the arrangements of FIG. 2 and FIG. 6. The corresponding conductive tracks connecting each electrode with a respective voltage source must be similarly isolated.

In addition to removing conductive material from the top surface 13' of each piezoelectric actuator wall 13 so as to separate the electrodes, 190', 190", on either side of each wall, conductive material must also be removed from the surface of the substrate 86 in such a way as to define respective conductive tracks 197, 192" for each electrode 190' 190". At the transition between piezoelectric material 100 and substrate 86, the end surface of the piezoelectric material 10 is angled or 25 chamfered as shown at 195. As is known, this has the advantage over a perpendicular cut (of the kind indicated by a dashed line at 197) of allowing the vapourising laser beam—shown figuratively by arrow 196—to impinge on and which, being typically 300 μm thick and formed of ceramic and glass, are vulnerable to damage. A chamfer angle of 45 degrees has been found to be suitable.

It will also be appreciated—with reference to FIGS. 5 and 6—that the electrodes and conductive tracks associated with the active portions 140*a* need to be isolated from those associated with 140*b* in order that the rows of nozzles might be operated independently. Although this too may be achieved by a laser "cut" along the surface of the substrate 86 extending between the two piezoelectric strips, it is more simply achieved by the use of a physical mask during the electrode deposition process or by the use of electric discharge machining.

Figure 9:
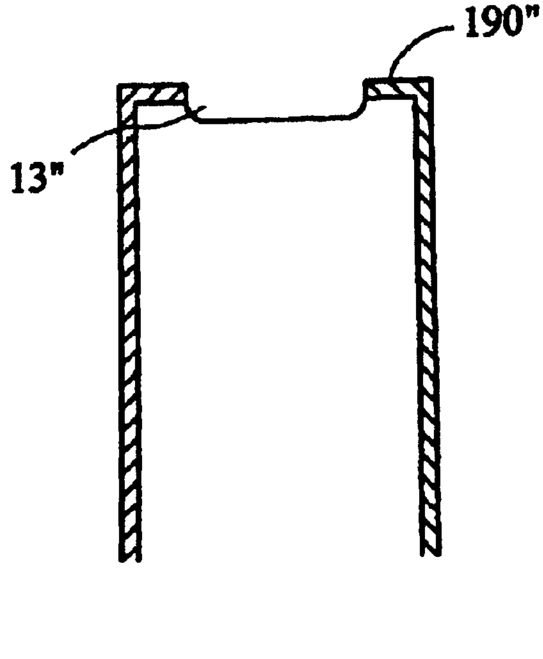
FIG. 9 is an enlarged detail view illustrating a problem that can arise with the arrangement shown in FIG. 8.

With reference to FIG. 9, the applicant has found that the process of removing the electrode material from the top of the walls causes removal of a small portion of the PZT and this results in the formation of a groove (13"). This has a detrimental effect on the rigidity of the PZT to cover bond and subsequently reduces the activity of the printhead and increases the voltage required to obtain the same level actuation.

In accordance with an aspect of the present invention, the use of an adhesive fined with particles having a stiffness greater than the stiffness of the adhesive maintains a stiff bond between the walls and the cover and ensures that the activity of the wall is not compromised. In an alternative method of joining the PZT to a cover, a filled adhesive is applied to the grooves and allowed to harden prior to the joining of the PZT and cover with a conventional non-filled adhesive.

Where the cover 130 in FIG. 6 is conductive it is, naturally, a requirement that a short circuit between the electrode 190" and the cover is prevented. A thicker glue layer at the join prevents a short circuit but has the effect of lowering the stiffness of the bond and reducing the activity of the wall. As above, the filled adhesives maintain a stiff bond.

It is advantageous in all these uses of the filled adhesives that the size of the particles used are tightly controlled and the optimum size of particle can be found as a function of wall height, cover material, stiffness required amongst other things. Typically the particle size will be between 1 and 10 $\mu$m, more preferably between 3 and 7 $\mu$m. In the preferred embodiments the average particle size is 5 $\mu$m+/−1 $\mu$m. It is narrow range of particle size that gives the bond a consistent and high strength.

Laser machining can also be used in a subsequent step to form the ink ejection holes 96*a*, 96*b* in the base of each channel, as is known in the art. Such holes may directly serve as ink ejection nozzles. Alternatively, there may be bonded to the lower surface of the substrate 86 a separate plate (not shown) having nozzles that communicate with the holes 96*a*, 96*b* and which are of a higher quality that might otherwise be possible with nozzles formed directly in the ceramic or glass base of the channel. Appropriate techniques are well-known, particularly from WO 93/15911 which discloses a technique for the formation of nozzles in situ, after attachment of the nozzle plate, thereby simplifying registration of each nozzle with its respective channel.

This cover 130 fulfils several functions: firstly, it closes each channel along those portions 140*a*, 140*b* where the walls incorporate piezoelectric material in order that actuation of the material and the resulting deflection of the walls might generate a pressure pulse in the channel portions and cause ejection of a droplet through a respective opening. Secondly, the cover and substrate define between them ducts 150*a*, 150*b* and 150*c* which extend along either side of each row of active channel portions 140*a*, 140*b* and through which ink is supplied. The cover is also formed with ports 88, 90, 92 which connect ducts 150*a*, 150*b* and 150*c* with respective parts of an ink system. In addition to replenishing the ink that has been ejected, such a system may also circulate ink through the channels (as indicated by arrows 112) for heat, dirt and bubble removing purposes as is known in the art. A final function of the cover is to seal the ink-containing part of the printhead from the outside world and particularly the electronics 84. This has been found to be satisfactorily achieved by the adhesive bond between the substrate 86 and cover rib 132, although additional measures such as glue fillets could be employed. Alternatively, cover rib may be replaced by an appropriately shaped gasket member.

Broadly expressed, the printhead of FIG. 5 includes a first layer having a continuous planar surface; a second layer of piezoelectric material bonded to said continuous planar surface; at least one channel that extends through the bonded first and second layers; the second layer having first and second portions spaced along the length of the channel; and a third layer that serves to close on all sides lying parallel to the axis of the channel portions of the channel defined by said first and second portions of said second layer.

It will be appreciated that restricting the use of piezoelectric material to those "active" portions of the channel where it is required to displace the channel walls is an efficient way, of utilising what is a relatively expensive material. The capacitance associated with the piezoelectric material is also minimised, reducing the load on and thus the cost of—the driving circuitry.

Figure 7:
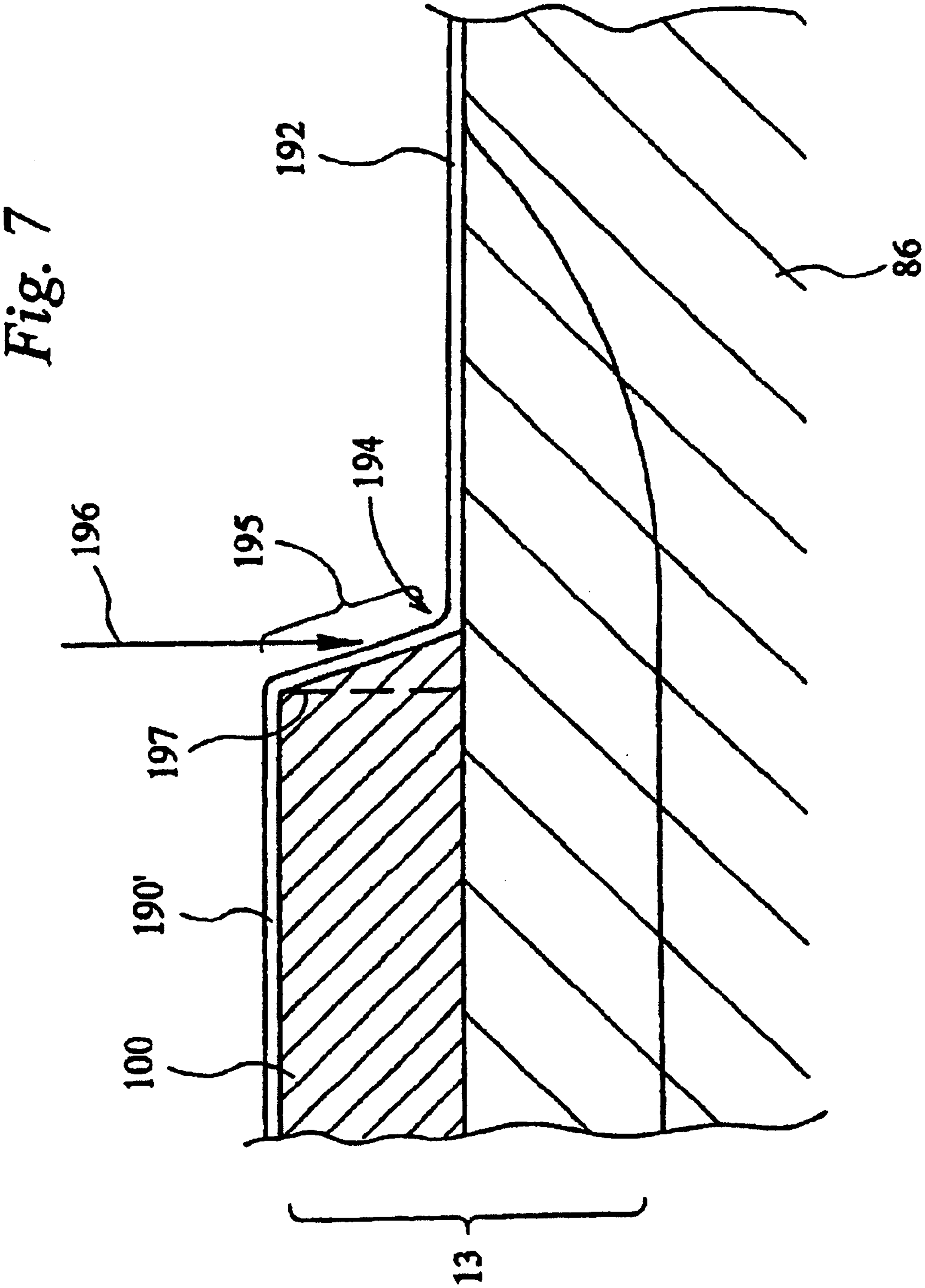
Figure 8:
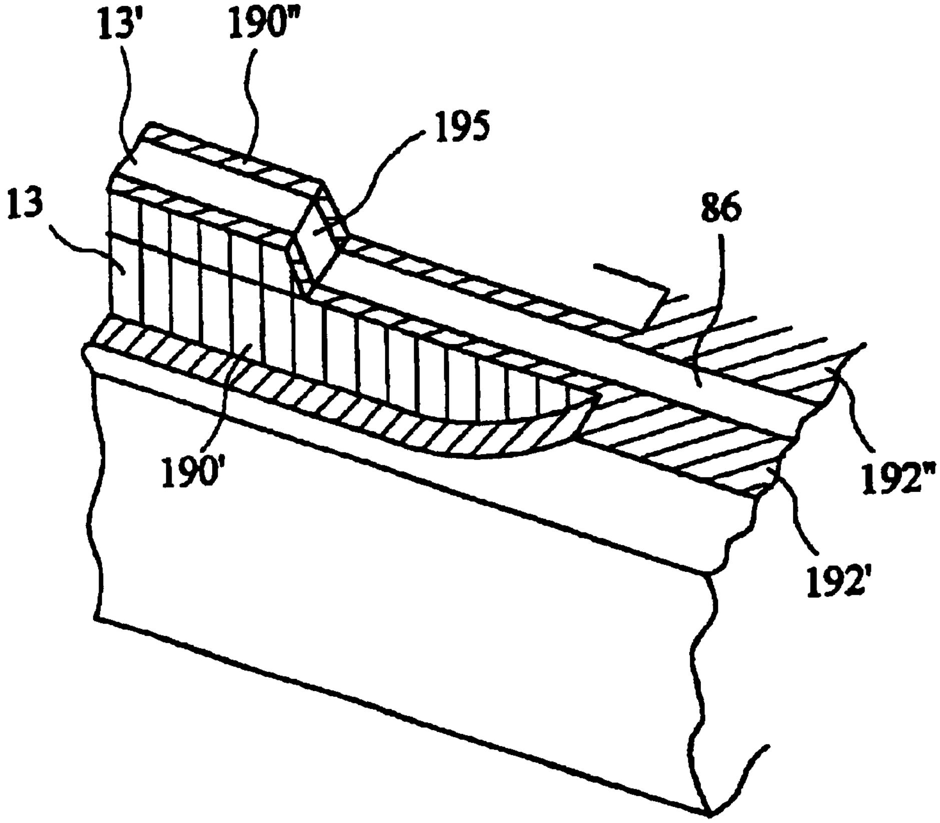
FIG. 8 is a detail perspective view of the device of FIG. 5.
Figure 10:
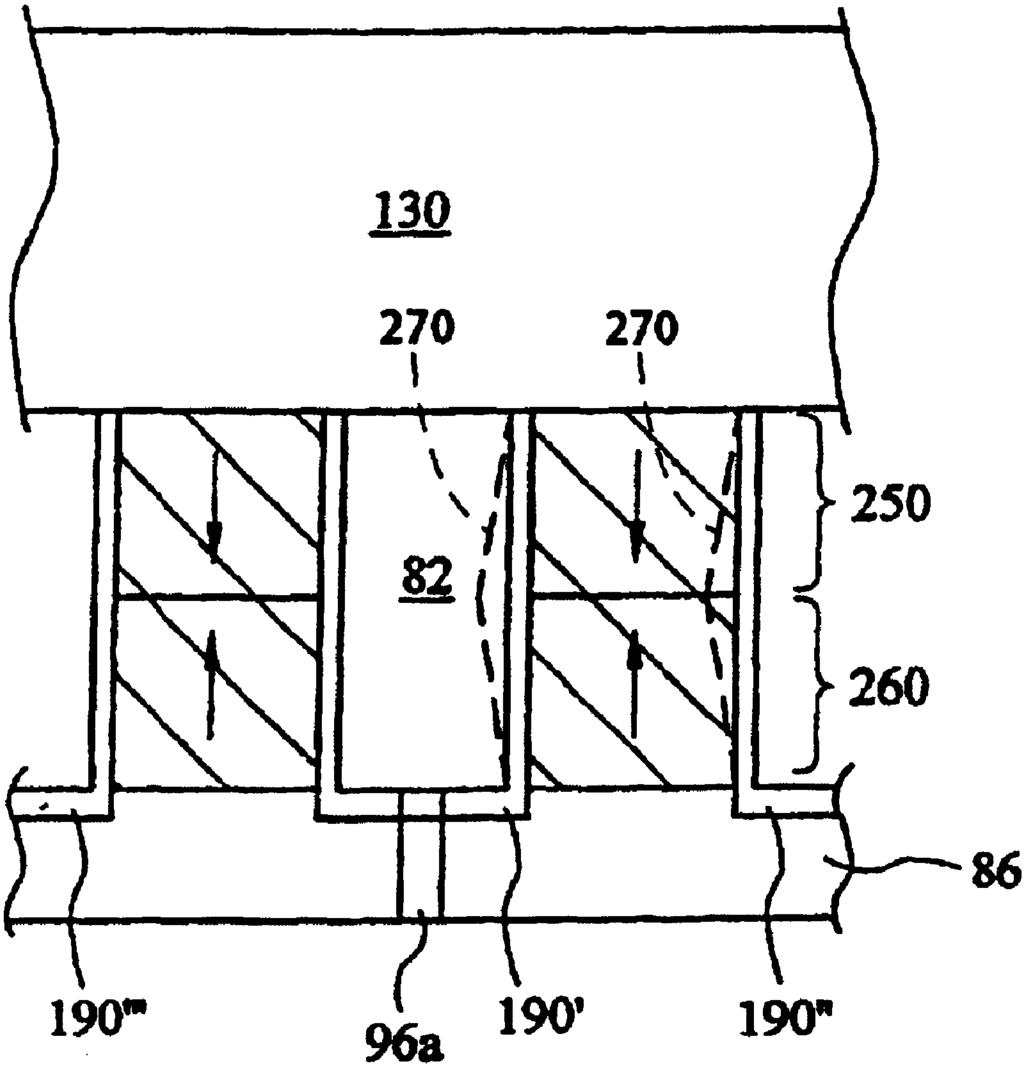
FIG. 10 is a cross-sectional view through a channel of a printhead according to a further embodiment.

Whereas the printhead of FIGS. 5, 6 and 7 employs actuator walls of the "cantilever" type in which only part of the wall distorts in response to the application of an actuating electric field, the actuator walls of the printhead of FIG. 10 actively distort over their entire height into a chevron shape. Such a "chevron" actuator has upper and lower wall parts 250, 260 poled in opposite directions (as indicated by arrows) and electrodes 190', 190" on opposite surfaces for applying a unidirectional electric field over the entire height of the wall. The approximate distorted shape of the wall when subjected to electric fields is shown exaggerated in dashed lines 270 on the right-hand side of FIG. 10.

Various methods of manufacturing such "chevron" actuator walls are known in the art, e.g. from EP-A-0 277 703, EP-A-0 326 973 and WO 92/09436. For the printhead of FIGS. 15 and 16, two sheets of piezoelectric material are first arranged such that their directions of polarisation are opposite to one another. The sheets are then laminated together, cut into strips and finally bonded to an inactive substrate 86, as already explained with regard to FIG. 5.

Figure 11:
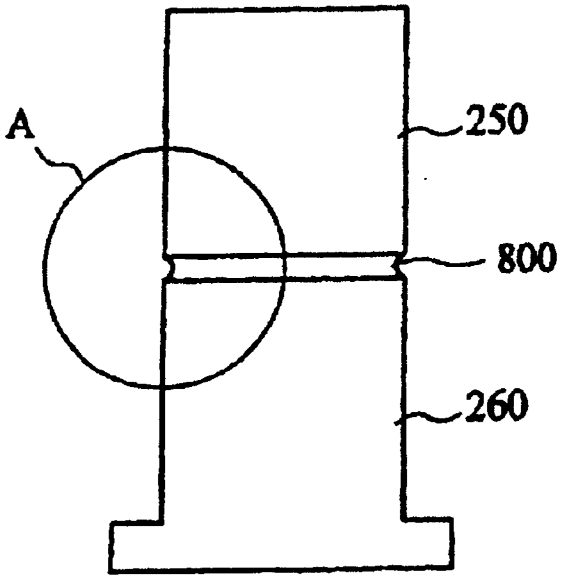
FIGS. 11, 12 and 13 are cross-sectional views of single "chevron" wall.
Figure 12:
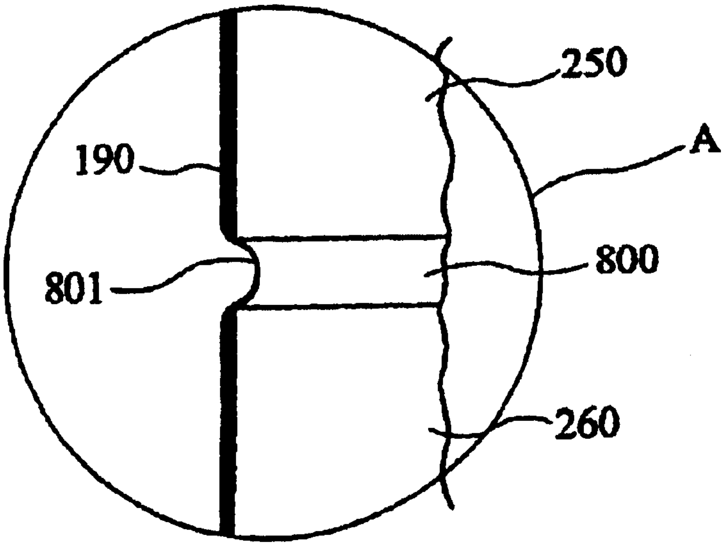

FIG. 11 depicts a "chevron" wall formed of two sheets of piezoelectric material 250, 260 bonded together by a glue layer 800. The walls have undergone plasma cleaning to remove any contaminants caused by the sawing process. It has been found that it is in the nature of the glue that plasma cleaning also etches the adhesive 800 to give a slight overhang of the piezoelectric material at the bond point.

In order to achieve maximum efficiency, a "chevron" wall requires separate electrodes to be formed over the whole surface of both sides of the wall. It has been found that the etching of the adhesive can cause poor electrode formation at the bond point especially when the electrodes are formed by line of sight methods such as sputtering or electron beam plating. In its worst case, the result can be complete separation of the electrodes on the top and bottom sections of the piezoelectric with no electrode material being deposited at point 801 along the entire length of the wall.

It is sometimes difficult to achieve adhesion of the electrode material to the adhesives used and this can lead to deficiencies such as tearing or other damage when the component undergoes further processing for example cleaning or passivation.

Figure 14:
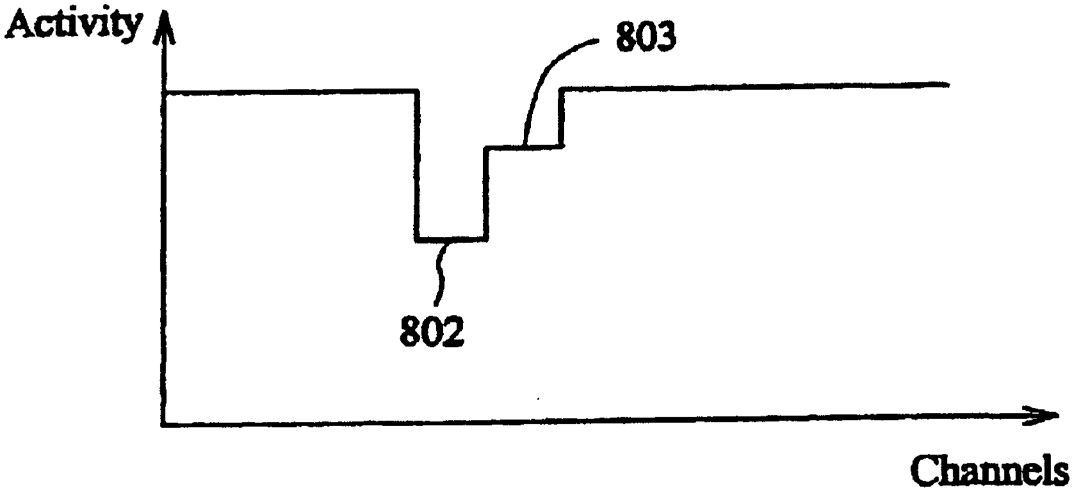
FIG. 14 is a graph depicting channel activity across a printhead.

A typical graph showing the activity of the printhead manufactured according to these conventional techniques is shown in FIG. 14. Point 802 depicts the situation where both sides of the wall have electrodes broken by the adhesive material. Because only half the wall can then be actuated, the activity is reduced. At point 803, one side of a wall has a broken electrode, whilst the other side of the wall has a fully active electrode. At all other points on the graph the electrodes on both sides of the wall are fully formed.

Another aspect of the present invention overcomes the problem of poor electrode formation at the adhesive bond through the use of filled adhesives in a thin layer.

Figure 13:
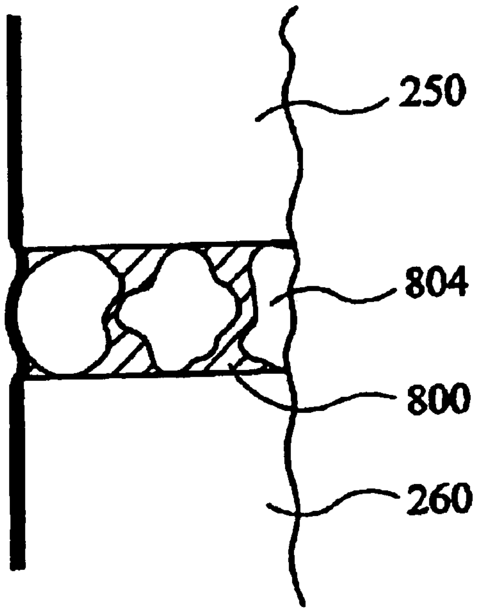

As can be seen from FIG. 13, which is an enlarged view of the region A in FIG. 11 and where the adhesive 800 contains particles 804, plasma etching after sawing removes the adhesive 800 to reveal the filler 804. This increases quality of the keying points for the electrode material and additionally reduces the overhang such that the plating will extend over the entire surface of the laminate. The particles, which have a stiffness greater than that of the adhesive, ensure that the compliance of the wall is not compromised through the use of a thicker glue bond. In a preferred embodiment, the adhesive has a thickness that is comparable to the size of the largest particle, i.e. there is only a single layer of particles separating the top and bottom sheets of the piezoelectric material. Thus by carefully controlling the size of the particles to between 5 and 20 $\mu$m and more preferably 5 and 10 $\mu$m, the adhesive is essentially self shimming.

The method of adding the particles to the adhesive must be carefully controlled to ensure adequate mixing, especially when the adhesive is a two part reactive glue such as epoxy. The ceramic increases the viscosity of the adhesive and at high loading can make it difficult disperse the particles throughout the adhesive. It has been found that mixing the adhesive with a volatile solvent increases the time available for mixing before the mixture becomes too thick. A suitable solvent is acetone. Other methods of ensuring an adequate mix are by adding the particles to one part of the adhesive mixture prier to the addition of the second adhesive part.

Further modifications include the provision of particles that are conductive. This allows for side-wall shear mode actuators to be formed with different poling architectures, the particles themselves potentially acting as the electrode material.

Following channel formation a conductive material is then deposited and electrodes/conductive tracks defined. In the examples shown, piezoelectric strips 110*a* and 110*b* are chamfered to facilitate laser patterning, as described above. Nozzle holes 96*a*, 96*b* are also formed in the substrate at two points along each channel.

Figure 15:
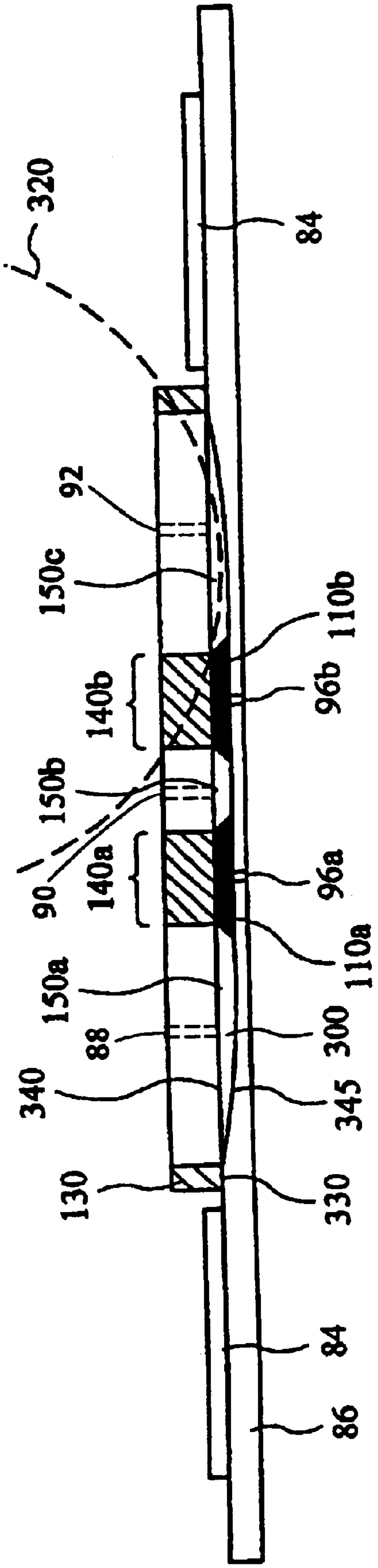
FIGS. 15, 16 and 17 are sectional views along the channel of a printhead illustrating constructional variations.

Finally a cover member 130 is bonded to the tops of the channel walls so as to create the closed, "active" channel lengths necessary for droplet ejection. In the printhead of FIG. 15, the cover member need only comprise a simple planar member formed with ink supply ports 88, 90, 92 since gaps 150*a*, 150*b*, 150*c* necessary for distributing the ink along the row of channels are defined between the lower surface 340 of the cover member 130 and the surface 345 of the trench 300. Sealing of the channels is achieved at 330 by the adhesive bond (not shown) between the lower surface 340 of the cover 130 and the upper surface of the substrate.

Figure 16:
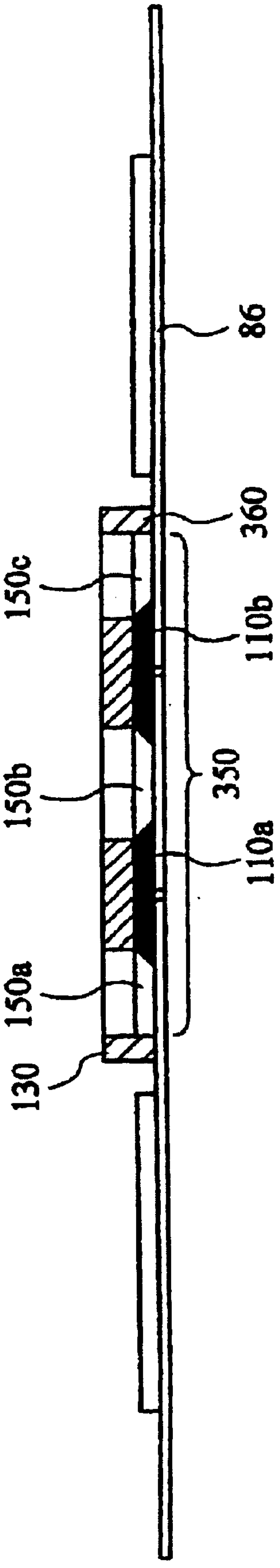

In FIG. 16, the simplicity of substrate 86 formed without trench 300 is offset by the need to form a trench-like structure 350 (defined, for example, by a projecting rib 360) in the cover 130 so as to define ink supply ducts 150*a*, 150*b*, 150*c*.

Figure 17:
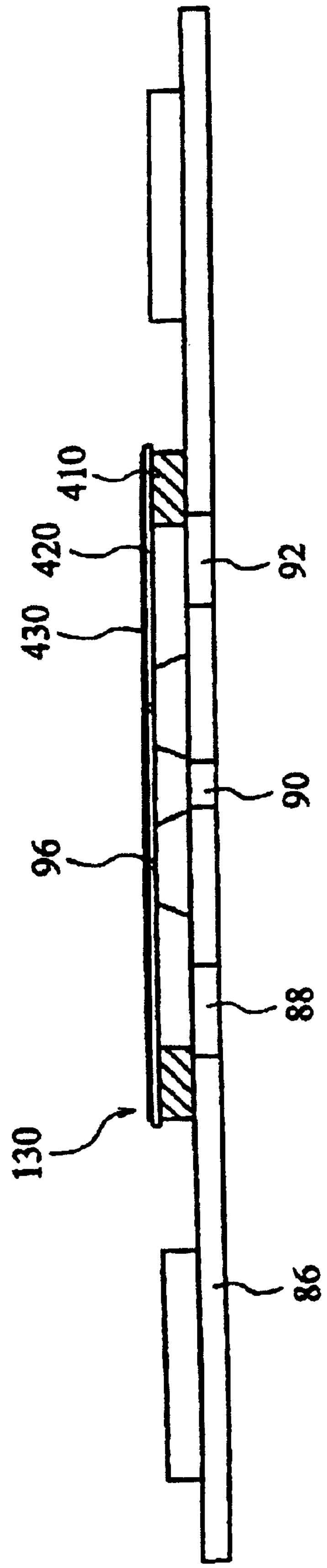

Turning to the embodiment of FIG. 17, this also employs the combination of a simple substrate 86 and a more-complex cover 130, in this case a composite structure made up of a spacer member 410 and a planar cover member 420. Unlike previous embodiments, however, it is the substrate 86 rather than the cover that is formed with ink supply ports 88, 90, 92 and the cover 130 rather than the substrate that is formed with holes 96 for droplet ejection. In the example shown, these holes communicate with nozzles formed in a nozzle plate 430 attached to the planar cover member 420.

Figure 18:
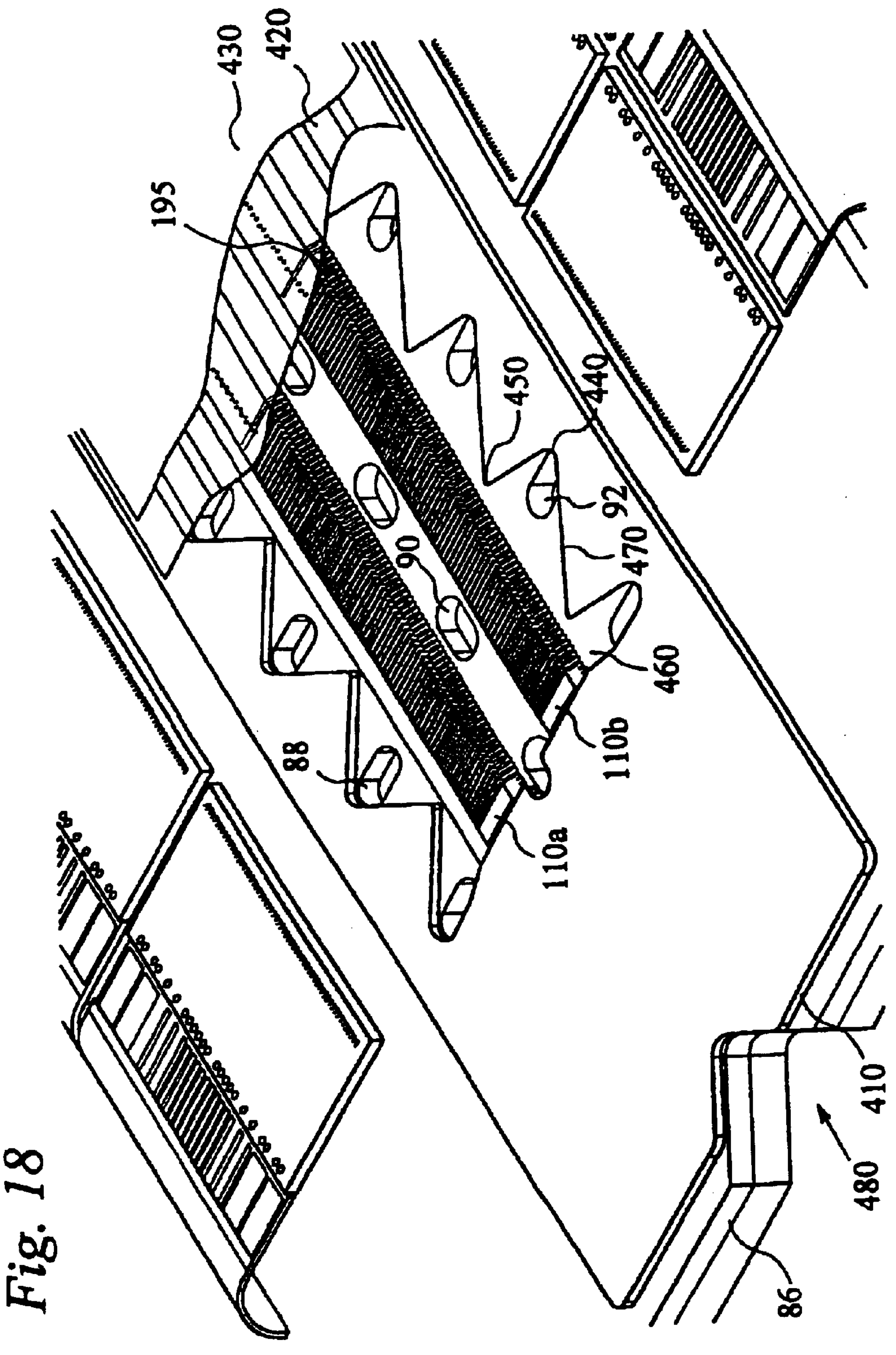
FIGS. 18 and 19 are perspective and detail perspective views respectively of the embodiment of FIG. 17.

FIG. 18 is a cut-away perspective view of the printhead of FIG. 17 seen from the cover side. The strips 110*a*, 100*b* of "chevron"—poled piezoelectric laminate have been bonded to substrate 86, and subsequently cut to form channels. A continuous layer of conductive material has then been deposited over the strips and parts of the substrate and electrodes and conductive tracks defined thereon in accordance with the present invention. As explained with regard to FIG. 7, the strips are chamfered on either side (at 195) to aid laser patterning in this transition area.

Figure 19:
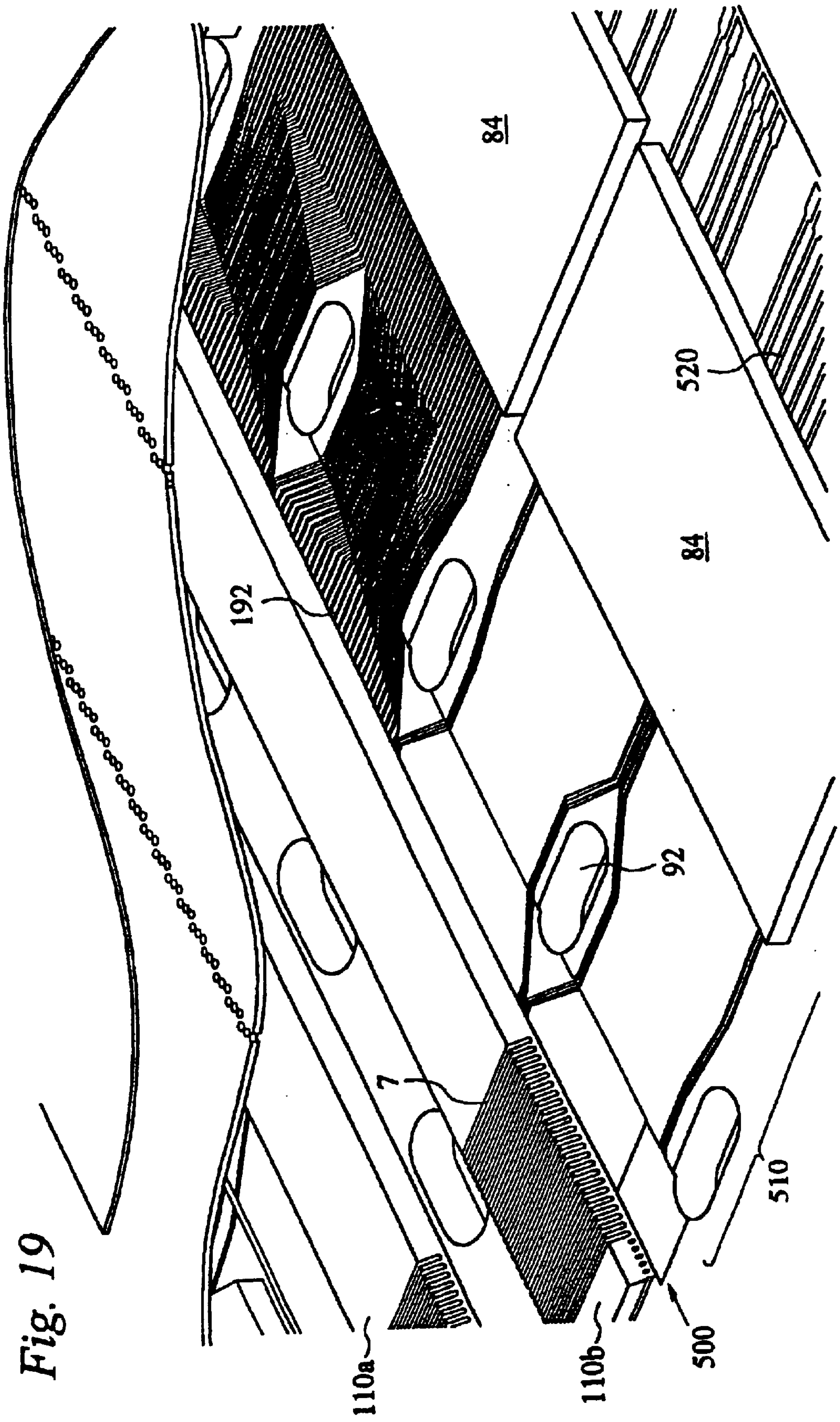

FIG. 19 is an enlarged view with spacer member 410 removed to show the conductive tracks 192 in more detail. Although not shown for reasons of clarity, it will be appreciated that these, like channels 7, extend across the entire width of the printhead. In the area of the—substrate adjacent each strip (indicated by arrow 500 with regard to strip 110*b*) the tracks are continuous with the electrodes (not shown) on the facing walls of each channel, having been deposited in the same manufacturing step. This provides an effective electrical contact.

However, elsewhere on the substrate—as indicated at 510—more conventional techniques, for example photolithographic, can be used to define not only tracks 192 leading from the channel electrodes to the integrated circuits 84 but also further tracks 520 for conveying power, data and other signals to the integrated circuits. Such techniques may be more cost effective, particularly where the conductive tracks are diverted around ink supply ports 92 and which would otherwise require complex positional control of a laser. They are preferably formed on the alumina substrate in advance of the ink supply ports 88, 90, 92 being drilled (e.g. by laser) and of the piezoelectric strips 110*a*, 110*b* being attached, chamfered and sawn. Following deposition of conductive material in the immediate area of the strips, a laser can then be used to ensure that each track is connected only with its respective channel electrode and no other.

Thereafter, both electrodes and tracks will require passivation, e.g. using silicon nitride deposited in accordance with WO 95/07820. Not only does this provide protection against corrosion due to the combined effects of electric fields and the ink (it will be appreciated that all conductive material contained within the area 420 defined by the inner profile 430 of spacer member 410 will be exposed to ink), it also prevents the electrodes on the opposite sides of each wall being short circuited by the planar cover member 430. Both cover and spacer are advantageously made of molybdenum or Nylo (Trade Mark) which, in addition to having similar thermal expansion characteristics to the alumina used elsewhere in the printhead, can be easily machined, e.g. by etching, laser cutting or punching, to high accuracy (Nylo is a Nickel alloy manufactured by Reynolds Corp.). This is particularly important for the holes for droplet ejection 96 and, to a lesser extent, for the wavy, bubble-trap-avoiding, inner profile 430 of the spacer member 410. Bubble traps are further avoided by positioning the trough 440 of the wavy profile such that it aligns with or even overlies the edge of the respective ink port 92. Crest 450 of the wavy profile is similarly dimensioned (to lie a distance—typically 3 mm, approximately 1.5 times the width of each strip 110a, 110b—from the edge of the adjacent strip 110a, 100b to ensure avoidance of bubble traps without affecting the ink flow into the channels.

Spacer member 410 is subsequently secured to the upper surface of substrate 86 by a layer of adhesive. In addition to its primary, securing function, this layer also provides back-up electrical isolation between the conductive tracks on the substrate. Registration features such as notch 440 are used to ensure correct alignment.

The last two members to be adhesively attached—either separately or following assembly to one another—are the planar cover member 420 and nozzle plate 430. Optical means may be employed to ensure correct registration between the nozzles formed in the nozzle plate and the channels themselves. Alternatively, the nozzles can be formed once the nozzle plate is in situ as known, for example, from WO 93/5911.

Figure 20:
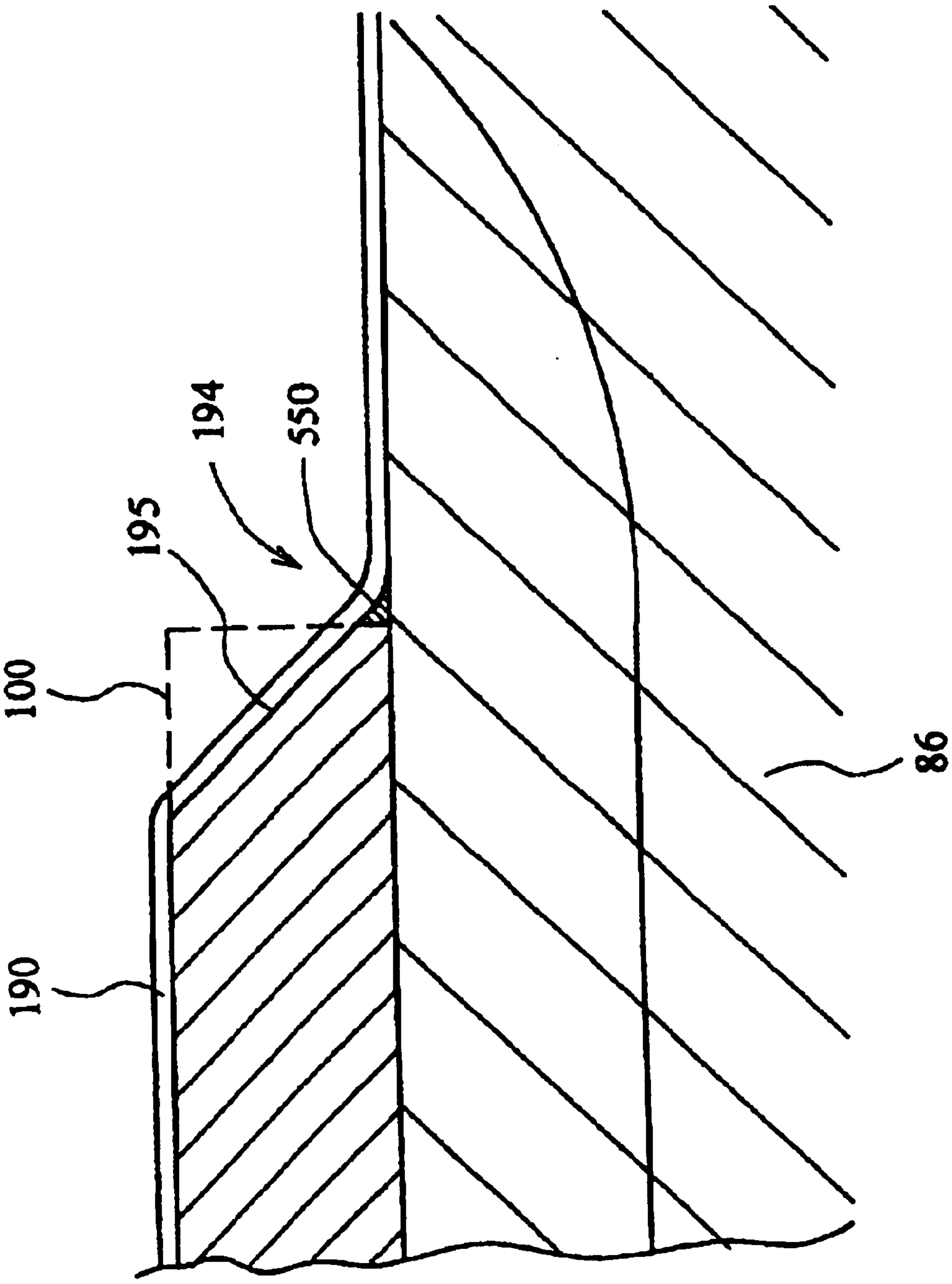
FIG. 20 is a detail view of the area denoted by reference numeral 194 in FIG. 7.

A further beneficial feature of using filled adhesives in accordance with an aspect of the present invention, is illustrated in FIG. 20, which is a detail view of the area denoted by reference numeral 194 in FIG. 7. The fillet 550 created when adhesive is squeezed out during creating of the joint between the piezoelectric layer 100 and substrate 86 is advantageously retained when chamfer 195 is formed on the end surface of the layer as described above. The fillers in this adhesive fillet are subsequently exposed when the assembly is subjected to a pre-plating cleaning step (e.g. plasma etching) and provides a good key for the electrode material 190 in an area that would otherwise be vulnerable to plating faults caused by etching of the adhesive and the properties of the adhesive which does not allow for a strong bond to form with electrodes formed by certain methods.

Figure 21:
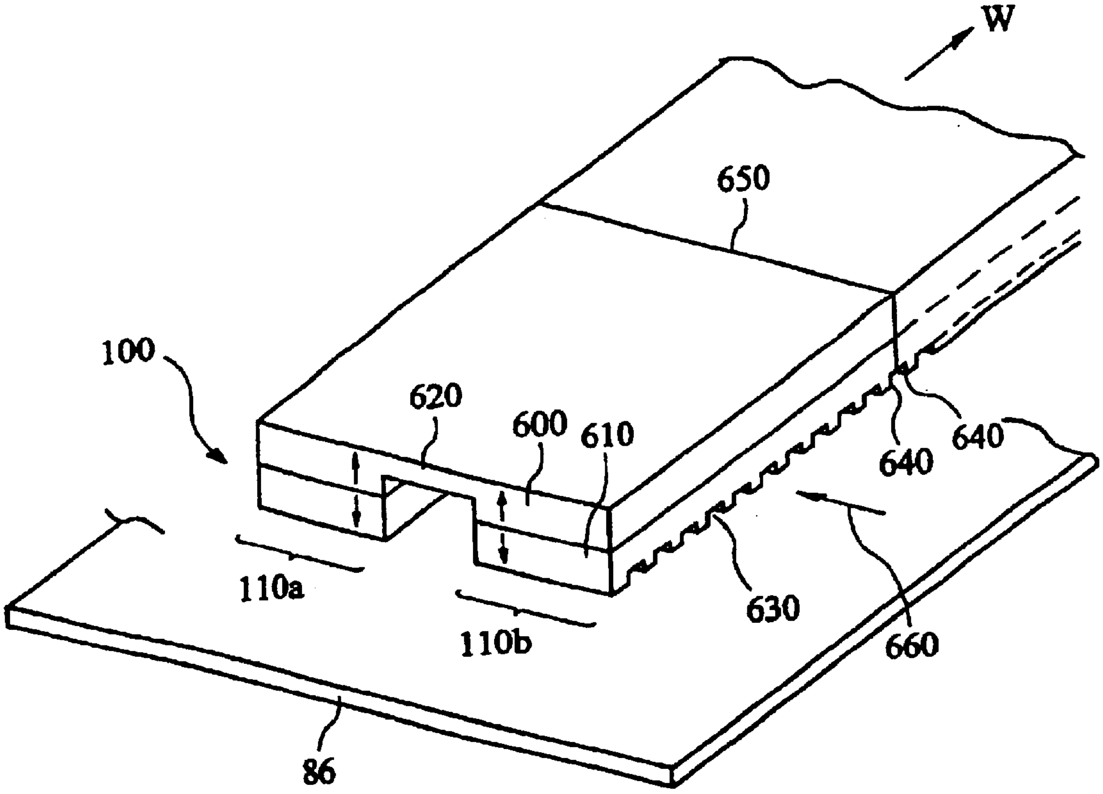
FIG. 21 is a perspective view showing a step in the manufacture of a printhead of the kind shown in FIG. 17.
Figure 22:
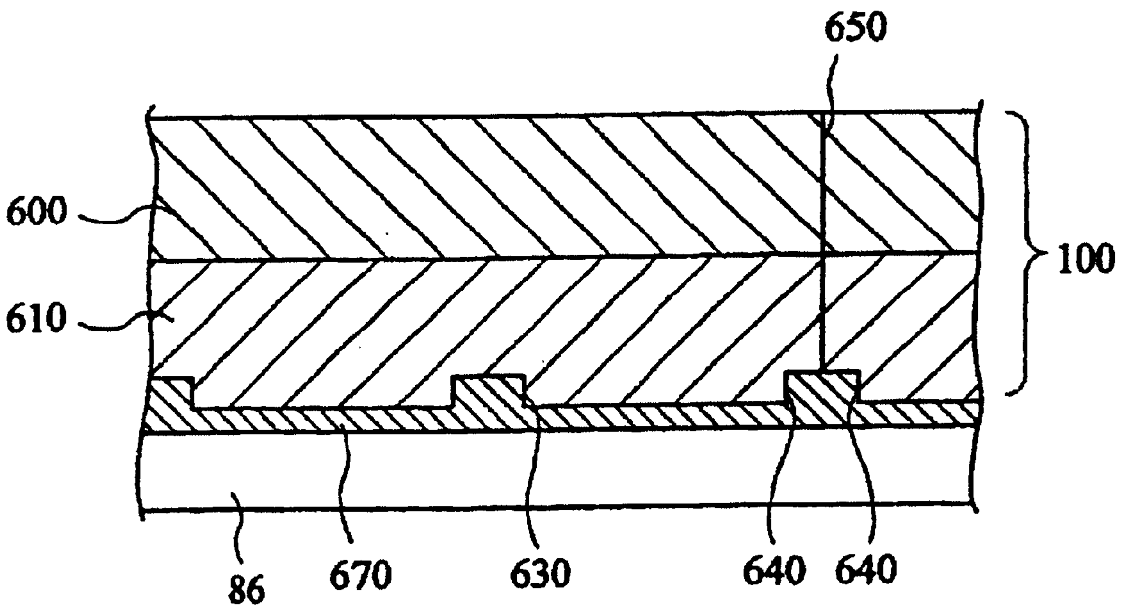
FIG. 22 is a view taken along arrow 660 in FIG. 21.

Further aspects of the present invention will now be discussed with respect to FIGS. 21 to 26. FIG. 15 shows a block of piezoelectric material 100 prepared ready for attaching to a substrate. It can be seen that the "pagewide" strips of piezoelectric material 110a and 110b are formed from a number of butted elements. As has already been mentioned, uniformity of the strip-substrate bond is ensured by the use of adhesive flow relief channels 630 formed in the lower surface of the strip 610 at locations corresponding to the ink channels formed in a subsequent step. A further relief channel is formed at the butt joint 650 between strips by half width channels 640 formed in respective ends of the strips. As shown in FIG. 22, which is a detail view taken along arrow 660 of FIG. 21, preferably sufficient adhesive 670 is applied to completely fill the relief channels 630 and 640.

Figure 23:
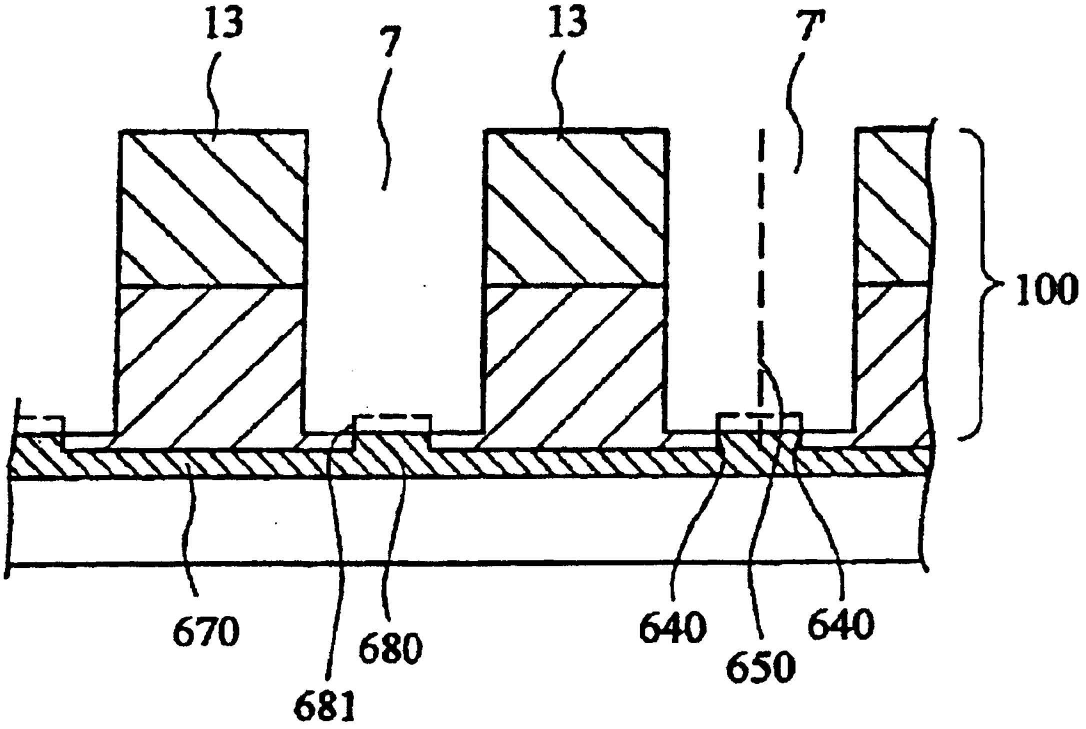
FIGS. 23 to 28 are cross-sectional views of a printhead according to still further aspects of the present invention.

The applicant has found that unexpected benefits are secured when relief channels are sawn at positions that correspond to the upper ink ejection channels 7. Once the adhesive bond 670 has cured, ink channels 7 are formed in the top surface of the piezoelectric layer. FIG. 23 shows how the channels are so positioned and are cut to such a depth that they communicate with the glue relief channels 630, possibly even removing some of the adhesive in the relief channels depicted by dotted lines 681 in FIG. 23 Similarly, the ink channel 7' formed at the butt joint 650—a principle known from the aforementioned U.S. Pat. No. 5,193,256—communicates with the relief channel formed from half channels 640. As a result, each of the channel walls 13 is connected to its neighbours only by adhesive 670, reducing the crosstalk that would otherwise take place through the piezoelectric base material (this problem is discussed in more detail in EP-A-0 364 136). Beneficially the channel formed at the butt join 650 and the channels at all other points along the array are substantially identical in terms of their appearance and activity.

It has been found advantageous to use at various points in the printhead an adhesive that is "filled", i.e. that contains particles having a stiffness greater than that of the adhesive itself. The resultant glue thus has a stiffness greater than that of a non-filled glue and hence one that is closer to that of the piezoelectric material. One such point is at the bond between the strips of piezoelectric material 110a,b and the surface of the substrate 86 which ensures a more rigid joint and a more rigid actuator wall overall. This in turn increases actuator efficiency—a principle known, for example, from EP-A-0 277 703. Ceramic particles—e.g. of Aluminium Oxide, Silicon Carbide, fumed Silica or Silica flour used at 30–50% w/w with epoxy adhesives such as Epotek (Trademark) or Ablebond (Trademark) have proved particularly effective either on their own or as part of a mixture. Other particles having a stiffness greater than that of the adhesive may be used, including metallic or plastic (polymeric, thermoplastic, thermosetting etc.).

A benefit of this structure is that it reduces the crosstalk without any noticeable reduction in activity. As the filled adhesives have a stiffness approaching that of the piezoelectric material, there is less requirement to ensure that the upper channels accurately correspond to an associated lower channel and therefore relaxes the tolerances required to manufacture the head.

Figure 24:
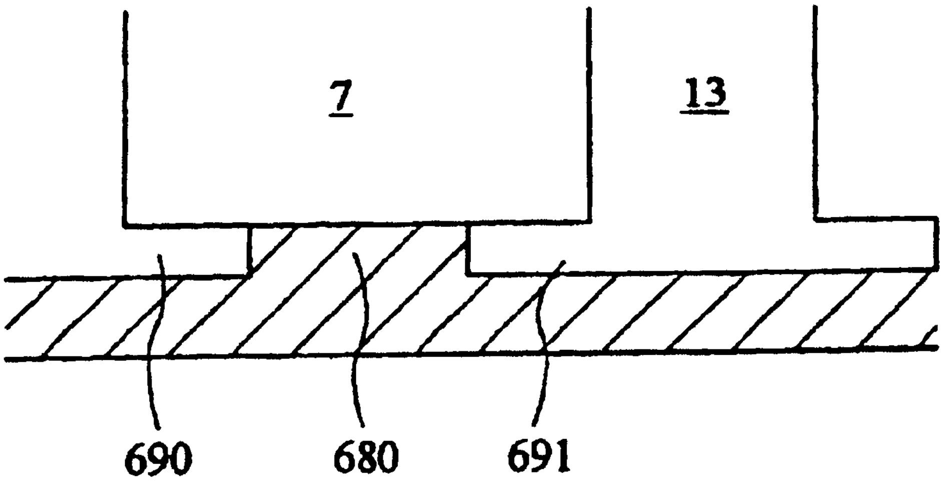

Furthermore, this technique ensures that any part of the channel wall 13 extending below the depth of the channel proper, for example points 690 and 691 as shown in FIG. 24 are supported on either side by a fillet 680 of adhesive that itself has a high stiffness by dint of the ceramic filler. Careful control of the bonding step ensures that the stiffness of the joint at the bottom of the wall remains uniform at the join between two strips and elsewhere across the head—an important factor in the uniformity of ejection velocity between channels (EP-A-0 364 136 is again referred to in this regard) which in turn is a well-known, key factor affecting the quality of the printed image Other benefits using this method are also obtained where it is desirable to remove the glue guard completely. As is discussed above, the stiffness of the joint at the bottom of the wall is important and where unfilled adhesives are filled the bond needs to be thin to achieve the required stiffness. By incorporating fillers, the same stiffness can be achieved using a thicker layer of adhesive. Additionally where the substrate is significantly harder than the piezoelectric material tight control of the saw is required so that it is not damaged by cutting too far and hence into the substrate. The thicker glue layer allowed through the addition of the fillers allows the manufacturing tolerances to be relaxed and leads to an increase in the life of the saw blades.

A further feature is explained with reference to FIG. 21. As already explained above, the piezoelectric material for the channel walls is incorporated in a layer 100 made up of two strips 110a, 110b each butted with other strips in the direction W necessary for a wide array of channels. Depending on whether the actuator is of the "cantilever" or "chevron" type, the piezoelectric layer will be polarised in one or two (opposed) directions and, in the latter case, may be formed from two oppositely-polarised sheets laminated together as shown at 600 and 610 in FIG. 21. To facilitate relative positioning, strips 110a, 110b are connected together by a bridge piece 620 that is removed in the chamfering step that takes place once strip 100 and substrate 86 have been bonded together using adhesive.

Figure 25:
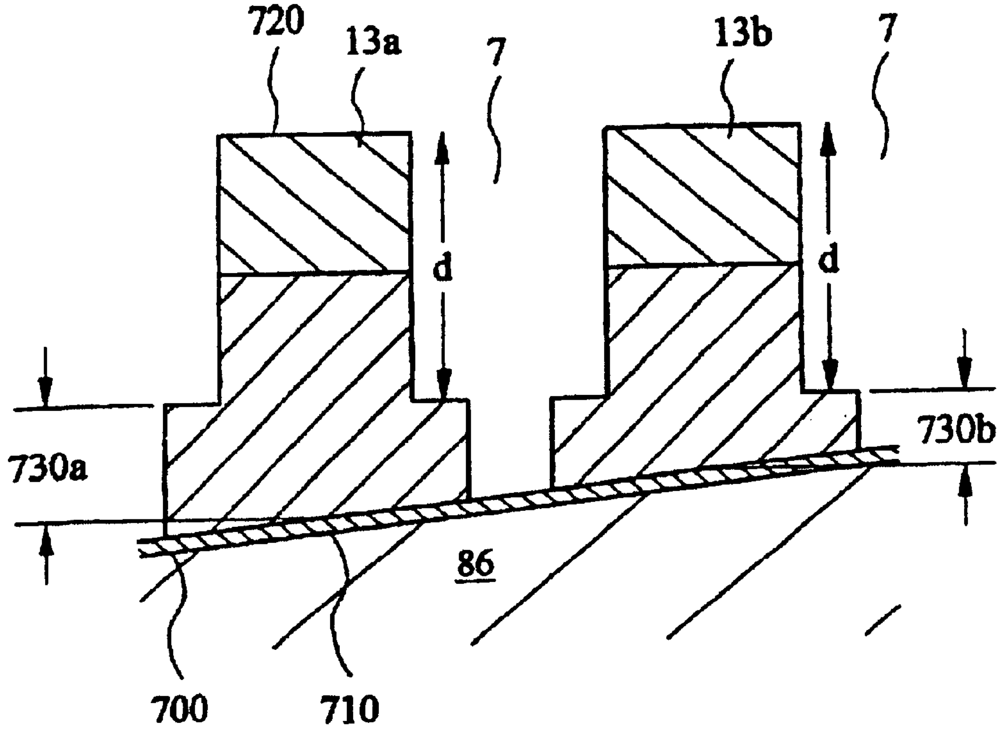

The improved stiffness that arises from the use of filled adhesive has a further use and effect that is discussed in more detail with reference to FIGS. 25 and 26. FIG. 25 depicts channel walls 13a and 13b attached to a substrate 86 having an uneven surface (represented by slope 700) by means of a constant-thickness adhesive layer 710. Channels 7 are also of constant depth d, as a result of the top surface 720 of the piezoelectric strip having been planarised prior to channel formation e.g. by sawing with a disc cutter as is known in the art "d" is the "active height" of the wall, i.e. that part of the wall that deflects when subject to an electric field. It will be appreciated, however, that the joint at the bottom of the active height of wall 13*a* will be more flexible than that at the bottom of the active height of wall 13*b* as a result of the distance between the bottom of the active height and the substrate 86—denoted 730*a*—being greater for wall 13*a* than the corresponding distance 730*b* for wall 13*b*.

Figure 26:
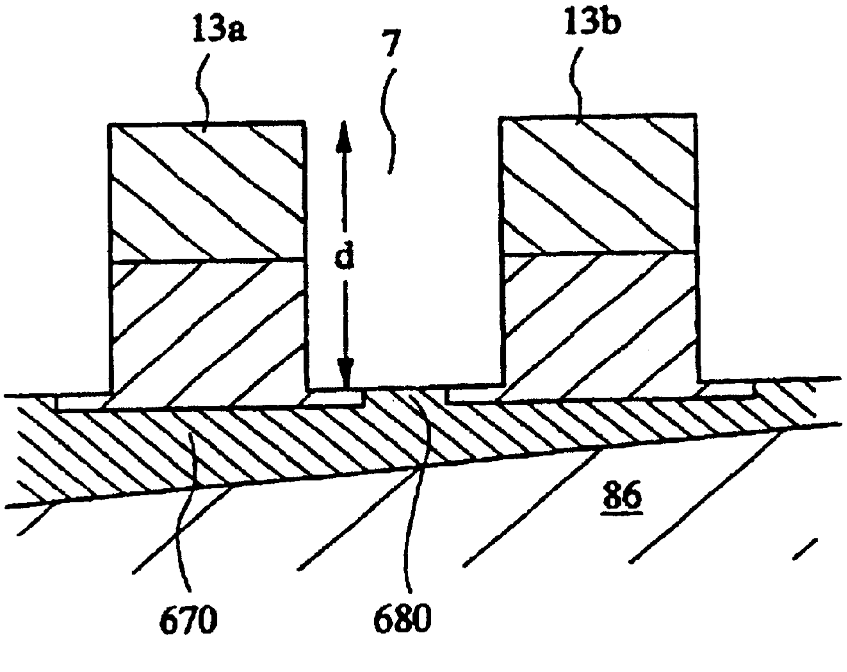

FIG. 26 shows the contrasting situation when the technique of this aspect of the present invention is employed. Fillet 680 of adhesive layer 670 extends to the bottom of the active height "d" of the wall regardless of the profile of the substrate 86. Bottom joint stiffness is therefore the same for both walls 13*a*, 13*b* and for all walls in the printhead in general. Uniformity, at least in this respect, is therefore ensured.

Figure 27:
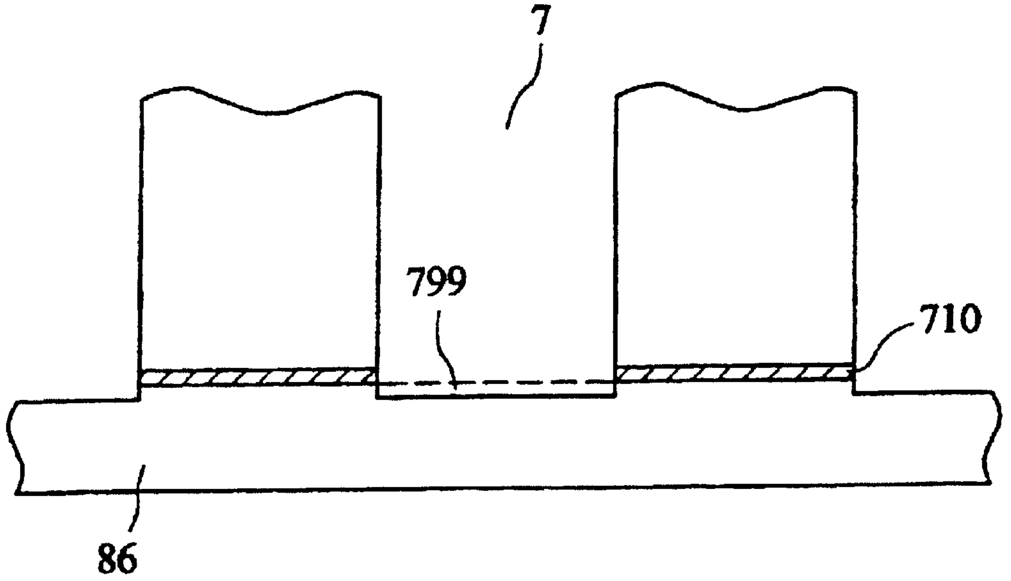
Figure 28:
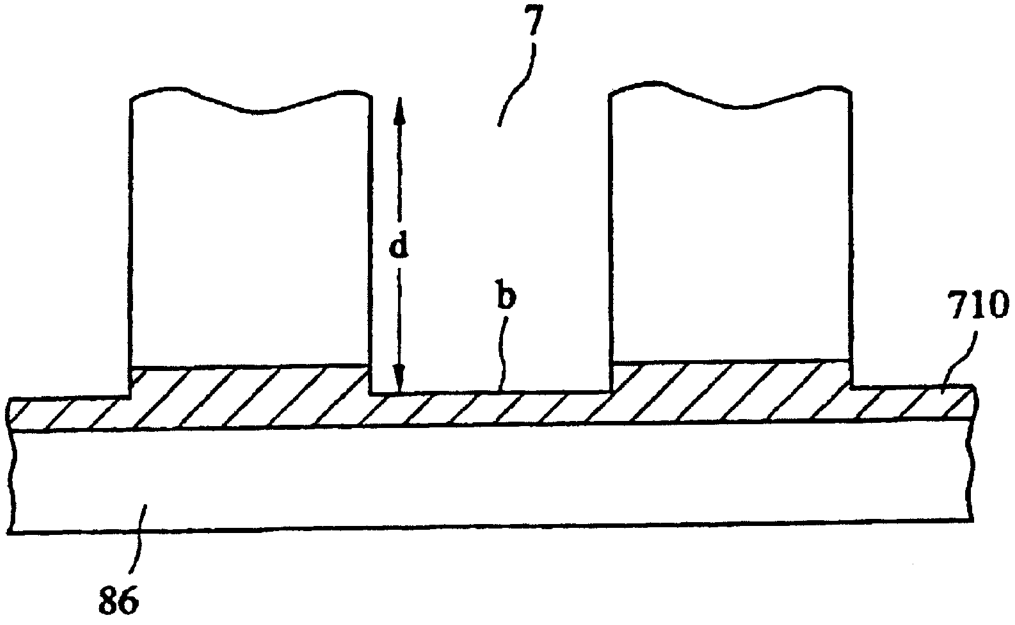

A further advantage of using a thicker adhesive layer is depicted in FIG. 27. As explained earlier, the material of the base must be carefully chosen to match the PZT. However, in certain circumstances it is preferable to use a material that has a hardness that is much greater than the PZT. As mentioned, the bond between the PZT and the base should be stiff and where conventional non-filled adhesives are used, this stiffness is achieved using a thin layer of adhesive 710. When the channels 7 are sawn it is often difficult to avoid cutting into the base, as shown by the hatched line at 799. In the case above where the base is formed of a hard material the act of cutting often results in damage to the saw blade which not only reduces the life of the blade and increases repair costs, it can in some instances damage the component being manufactured.

The present invention seeks to solve this problem through the incorporation of the filler particles. The stiffness of the adhesive is increased because of the presence of the particles and hence an acceptable stiffness can be achieved using a thicker layer of adhesive—typically up to 10 times thicker than that required to obtain an equivalent stiffness using unfilled adhesive. This means that sawing can extend into the abrasive layer so that the adhesive layer forms part of the active height of the wall, d and the whole of the base b, of the channel without a significant loss in activity. The tolerances on the sawing process can also be relaxed.

The present invention has been explained with regard to the figures contained herein but is in no way restricted to such embodiments. In particular, the present techniques are applicable to printheads of varying width and resolution, pagewide double-row being merely one of many suitable configurations. Printheads having more than two rows, for example, are easily realised using tracks used in multiple layers as well-known elsewhere in the electronics industry.

All documents, particularly patent applications, referred to are incorporated in the present application by reference.

What is claimed is:

1. A method of forming a component for use in a droplet deposition apparatus comprising the steps of providing a base, and a body of piezoelectric material having a top surface and a bottom surface; sawing a plurality of lower channels into the bottom surface of the body; bonding said bottom surface of the body to the base by adhesive means; and subsequently sawing a plurality of upper channels into the top surface of the body wherein at least one of the upper channels is sawn to such a depth that it extends through the body and connects to a corresponding lower channel.

2. The method according to claim 1, wherein sufficient adhesive is provided to fill the lower channels.

3. The method according to claim 1, wherein part of the adhesive is removed during the sawing step in which the at least one upper channel is formed.

4. The method according to claim 1, wherein the body is separated into at least two distinct arrays of channels after formation of the upper channels.

5. The method according to claim 1, wherein excess adhesive is squeezed to the sides of the body to form a fillet.

6. A method of forming a component for use in a droplet deposition apparatus comprising the steps of providing a base and a body of piezoelectric material having a top surface and a bottom surface, sawing lower channels into the bottom surface of the body, adhesively bonding said bottom surface of the body to the base by an adhesive layer, and subsequently sawing upper channels into the top surface of the body extending into the body, wherein the upper channels extend through the body and into the adhesive layer.

7. A component formed by the method according to claim 6 wherein the adhesive layer forms part of a wall of said piezoelectric material adjacent to said upper channels.

8. A component formed by the method according to claim 6 wherein the adhesive layer contains particles having a stiffness greater than the stiffness of the adhesive.

9. The method according to claim 6, wherein the base is stiff.

10. The method according to claim 6, wherein the base is formed of a material selected from a group consisting of alumina, aluminum nitride, INVAR, and glass.

11. The method according to claim 10, wherein part of the adhesive is removed during the sawing step in which the upper channel is formed.

12. A method of forming a component suitable for use in a droplet deposition apparatus, comprising the steps of bonding a body of piezoelectric material to a base through a layer of adhesive material and cutting channels in the piezoelectric material to leave actuable piezoelectric side walls, wherein the channels are cut so as to expose said adhesive material.

13. The method according to claim 12, wherein the adhesive material contains particles having a stiffness greater than the stiffness of the adhesive.

14. The method according to claim 12, further comprising, prior to said step of cutting channels in the piezoelectric material, cutting relief slots in the piezoelectric material at locations aligned with said channels, and arranging for said adhesive material to fill the relief slots in bonding of the piezoelectric material to the base such that the said step of cutting said channels serves to expose adhesive material in the relief slots.

15. A method of forming a component for use in a droplet deposition apparatus, the component comprising a base, a plurality of droplet liquid channels, and a plurality of piezoelectric walls defined between adjacent ones of said channels and each supported on the base so as to be capable in the droplet deposition apparatus to be caused to move into or out of the selected channel to effect droplet deposition, the method comprising the steps of providing a base, and a body of piezoelectric material having a top surface and a bottom surface; sawing a plurality of lower channels into the bottom surface of the body; bonding said bottom surface of the body to the base by adhesive, there being sufficient adhesive provided to fill the lower channels; and subsequently sawing a plurality of upper channels into the top surface of the body; wherein each of the upper channels defines a said droplet liquid channel and is sawn to such a depth that it extends through the body and connects to the corresponding lower channel.

* * * * *

UNITED STATES PATENT AND TRADEMARK OFFICE

CERTIFICATE OF CORRECTION

PATENT NO. : 6,725,543 B2
DATED : April 27, 2004
INVENTOR(S) : Sarojiniamma et al.

It is certified that error appears in the above-identified patent and that said Letters Patent is hereby corrected as shown below:

Title page, Item [54] and Column 1, line 1,
Title, delete "DROPLET DEPOSITION APPARATUS" and insert
-- METHOD OF MAKING DROPLET DEPOSITION APPARATUS --.

Signed and Sealed this

Third Day of May, 2005

JON W. DUDAS
*Director of the United States Patent and Trademark Office*